US011983993B2

(12) United States Patent
Bolling, Jr. et al.

(10) Patent No.: US 11,983,993 B2

(45) Date of Patent: May 14, 2024

(54) SYSTEMS AND METHODS FOR COLLECTING GAME PLAY ENHANCERS FOR ENHANCING A BONUS GAME

(71) Applicant: Aristocrat Technologies, Inc., Las Vegas, NV (US)

(72) Inventors: T. Grant Bolling, Jr., Maryland Heights, MO (US); Eric Taylor, Carson City, NV (US)

(73) Assignee: Aristocrat Technologies, Inc., Las Vegas, NV (US)

( * ) Notice: Subject to any disclaimer, the term of this patent is extended or adjusted under 35 U.S.C. 154(b) by 30 days.

(21) Appl. No.: 17/679,899

(22) Filed: Feb. 24, 2022

(65) Prior Publication Data

US 2022/0284774 A1 Sep. 8, 2022

Related U.S. Application Data

(60) Provisional application No. 63/156,719, filed on Mar. 4, 2021.

(51) Int. Cl.

*G07F 17/32* (2006.01)

*G07F 17/34* (2006.01)

(52) U.S. Cl.

CPC ...... *G07F 17/3267* (2013.01); *G07F 17/3213* (2013.01); *G07F 17/34* (2013.01)

(58) Field of Classification Search

None

See application file for complete search history.

(56) References Cited

U.S. PATENT DOCUMENTS

| | | | | |
|---|---|---|---|---|
| 2009/0258690 | A1 | 10/2009 | Tarantino | |
| 2010/0120495 | A1 * | 5/2010 | Frank | G07F 17/3244 463/20 |
| 2010/0120504 | A1 | 5/2010 | Larsen | |
| 2011/0045898 | A1 | 2/2011 | Anderson | |
| 2012/0094745 | A1 * | 4/2012 | Cohen | G07F 17/3244 463/31 |

* cited by examiner

*Primary Examiner* — Robert T Clarke, Jr.

(74) *Attorney, Agent, or Firm* — Armstrong Teasdale LLP

(57) ABSTRACT

An electronic gaming machine includes a memory device and a processor configured to execute instructions stored on the memory device, which when executed, cause the processor to initiate a base game and select a game play enhancer for use during a bonus game. The instructions further cause the processor to generate a reconfiguration data file based on the selected game play enhancer. The reconfiguration data file including executable instructions causing game play of the bonus game to be modified. The instructions further cause the processor to initiate, in response to a trigger condition being satisfied, the bonus game based on the reconfiguration data file and determine a game outcome of the bonus game.

20 Claims, 9 Drawing Sheets

SYSTEMS AND METHODS FOR COLLECTING GAME PLAY ENHANCERS FOR ENHANCING A BONUS GAME

CROSS REFERENCE TO RELATED APPLICATIONS

This application claims the benefit of priority to U.S. Patent Application No. 63/156,719, filed Mar. 4, 2021, which is incorporated by reference herein in its entirety.

TECHNICAL FIELD

The present disclosure relates generally to the field of electronic gaming, and more particularly to systems and methods for collecting one or more game play enhancers to be used during a bonus game of an electronic game, and for enhancing game play during the bonus game.

BACKGROUND

Electronic gaming machines ("EGMs") or gaming devices provide a variety of wagering games such as slot games, video poker games, video blackjack games, roulette games, video bingo games, keno games and other types of games that are frequently offered at casinos and other locations. Play on EGMs typically involves a player establishing a credit balance by inputting money, or another form of monetary credit, and placing a monetary wager (from the credit balance) on one or more outcomes of an instance (or single play) of a primary or base game. In some cases, a player may qualify for a special mode of the base game, a secondary game, or a bonus round of the base game by attaining a certain winning combination or triggering event in, or related to, the base game, or after the player is randomly awarded the special mode, secondary game, or bonus round. In the special mode, secondary game, or bonus round, the player is given an opportunity to win extra game credits, game tokens or other forms of payout. In the case of "game credits" that are awarded during play, the game credits are typically added to a credit meter total on the EGM and can be provided to the player upon completion of a gaming session or when the player wants to "cash out."

"Slot" type games are often displayed to the player in the form of various symbols arrayed in a row-by-column grid or matrix. Specific matching combinations of symbols along predetermined paths (or paylines) through the matrix indicate the outcome of the game. The display typically highlights winning combinations/outcomes for identification by the player. Matching combinations and their corresponding awards are usually shown in a "pay-table" which is available to the player for reference. Often, the player may vary his/her wager to include differing numbers of paylines and/or the amount bet on each line. By varying the wager, the player may sometimes alter the frequency or number of winning combinations, frequency or number of secondary games, and/or the amount awarded.

Typical games use a random number generator (RNG) to randomly determine the outcome of each game. The game is designed to return a certain percentage of the amount wagered back to the player over the course of many plays or instances of the game, which is generally referred to as return to player (RTP). The RTP and randomness of the RNG ensure the fairness of the games and are highly regulated. Upon initiation of play, the RNG randomly determines a game outcome and symbols are then selected which correspond to that outcome. Notably, some games may include an element of skill on the part of the player and are therefore not entirely random.

In addition, although some conventional games may allow players to accrue one or more free spins for use during the secondary, or bonus game, traditional games typically lack any capability for aggregating, or collecting, a variety of symbols for any subsequent or later use. Similarly, traditional games also lack the capability to collect symbols associated with certain award enhancements for use during secondary or other games. As a result, systems and methods which not only permit players to collect symbols for use during subsequent games, but also allow players to collect certain symbols associated with various award enhancements, which may only be activated during certain subsequent games, are therefore desirable.

BRIEF DESCRIPTION

In one aspect an electronic gaming machine is provided. The electronic gaming machine includes a memory device and a processor configured to execute instructions stored on the memory device, which when executed, cause the processor to initiate a base game and select a game play enhancer for use during a bonus game. The instructions further cause the processor to generate a reconfiguration data file based on the selected game play enhancer. The reconfiguration data file including executable instructions causing game play of the bonus game to be modified. The instructions further cause the processor to initiate, in response to a trigger condition being satisfied, the bonus game based on the reconfiguration data file and determine a game outcome of the bonus game.

In another aspect a method is provided. The method includes initiating, by a processor, a base game and selecting, by the processor, a game play enhancer for use during a bonus game. The method further includes generating, by the processor, a reconfiguration data file based on the selected game play enhancer, the reconfiguration data file including executable instructions causing game play of the bonus game to be modified. The method further includes initiating, by the processor and in response to a trigger condition being satisfied, the bonus game based on the reconfiguration data file and determining, by the processor, a game outcome of the bonus game.

In yet another aspect, an electronic gaming machine is provided. The electronic gaming machine includes a display, a memory device, and a processor configured to execute instructions stored on the memory device. The instructions, when executed, cause the processor to initiate a base game, select a game play enhancer for use during a bonus game, and cause the game play enhancer to be shown on the display during play of the base game. The instructions further cause the processor to generate a reconfiguration data file based on the selected game play enhancer, the reconfiguration data file including executable instructions causing game play of the bonus game to be modified and initiate, in response to a trigger condition being satisfied, the bonus game based on the reconfiguration data file.

DETAILED DESCRIPTION

Systems and methods for providing and collecting one or more game play enhancers during a base game, and for use during a bonus game, are described. In at least some embodiments, one or more collection areas may be displayed, such as in association with a wheel that displays a plurality of game play enhancers capable of selection and aggregation to one or more of the collection areas. During game play, a base game may be initially provided, and in some cases, the wheel may be triggered during the base game. When the wheel spins, one or more game play enhancers may be selected from the wheel and aggregated in a given collection area. A player of the base game may thus refer to the collection during play of the base game to keep track of the award enhancements that have been collected. Moreover, the selected game play enhancers may be used to generate a reconfiguration data file, which modifies game play of the bonus game based on the selected game play enhancers.

In addition, a bonus or feature game may be triggered in response to one or more trigger conditions occurring during the base game. When the bonus game is triggered, the game play enhancers that have been collected by the player may be made available, such as for example, to enhance the chances of winning during play of the bonus game and/or to enhance awards provided during the bonus game. The bonus game may be executed based on the reconfiguration data file that is generated during play of the base game, thereby reducing the time and processing power required to initiate the bonus game once it is triggered. In one example, a game play enhancer may specify that a given symbol displayed during the bonus game is a WILD symbol, thereby increasing the chances that the player will form winning symbol combinations during the bonus game. In another example, a game play enhancer may specify that a given symbol displayed during the bonus game is associated with a multiplication factor, thereby enhancing an award provided during the bonus game.

Figure 1:
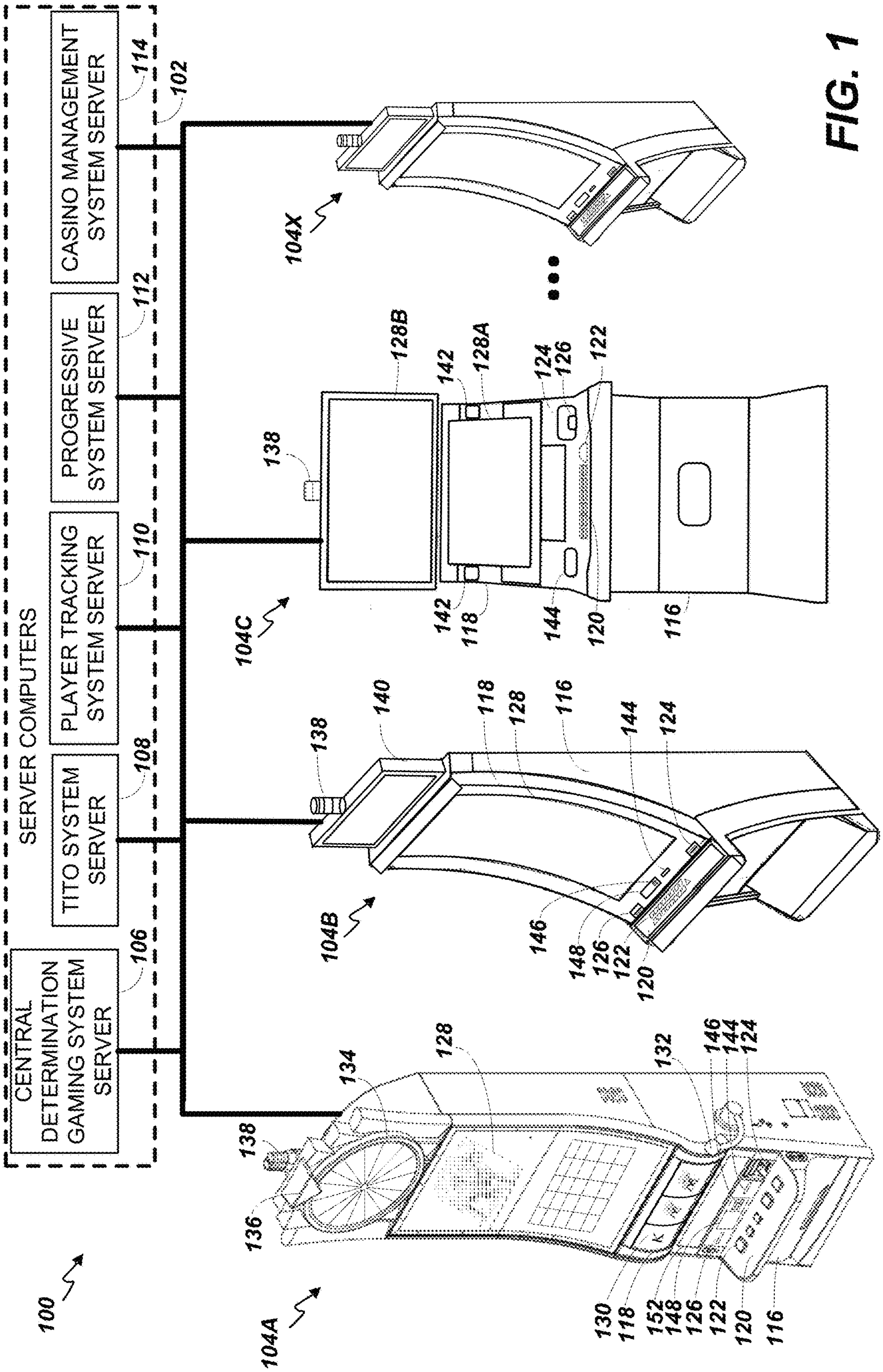
FIG. 1 is an exemplary diagram showing several EGMs networked with various gaming related servers.

FIG. 1 illustrates several different models of EGMs which may be networked to various gaming related servers. Shown is a system 100 in a gaming environment including one or more server computers 102 (e.g., slot servers of a casino) that are in communication, via a communications network, with one or more gaming devices 104A-104X (EGMs, slots, video poker, bingo machines, etc.) that can implement one or more aspects of the present disclosure. The gaming devices 104A-104X may alternatively be portable and/or remote gaming devices such as, but not limited to, a smart phone, a tablet, a laptop, or a game console. Gaming devices 104A-104X utilize specialized software and/or hardware to form non-generic, particular machines or apparatuses that comply with regulatory requirements regarding devices used for wagering or games of chance that provide monetary awards.

Communication between the gaming devices 104A-104X and the server computers 102, and among the gaming devices 104A-104X, may be direct or indirect using one or more communication protocols. As an example, gaming devices 104A-104X and the server computers 102 can communicate over one or more communication networks, such as over the Internet through a website maintained by a computer on a remote server or over an online data network including commercial online service providers, Internet service providers, private networks (e.g., local area networks and enterprise networks), and the like (e.g., wide area networks). The communication networks could allow gaming devices 104A-104X to communicate with one another and/or the server computers 102 using a variety of communication-based technologies, such as radio frequency (RF) (e.g., wireless fidelity (WiFi®) and Bluetooth®), cable TV, satellite links and the like.

In some implementation, server computers 102 may not be necessary and/or preferred. For example, in one or more implementations, a stand-alone gaming device such as gaming device 104A, gaming device 104B or any of the other gaming devices 104C-104X can implement one or more aspects of the present disclosure. However, it is typical to find multiple EGMs connected to networks implemented with one or more of the different server computers 102 described herein.

The server computers 102 may include a central determination gaming system server 106, a ticket-in-ticket-out (TITO) system server 108, a player tracking system server 110, a progressive system server 112, and/or a casino management system server 114. Gaming devices 104A-104X may include features to enable operation of any or all servers for use by the player and/or operator (e.g., the casino, resort, gaming establishment, tavern, pub, etc.). For example, game outcomes may be generated on a central determination gaming system server 106 and then transmitted over the network to any of a group of remote terminals or remote gaming devices 104A-104X that utilize the game outcomes and display the results to the players.

Gaming device 104A is often of a cabinet construction which may be aligned in rows or banks of similar devices for placement and operation on a casino floor. The gaming device 104A often includes a main door which provides access to the interior of the cabinet. Gaming device 104A typically includes a button area or button deck 120 accessible by a player that is configured with input switches or buttons 122, an access channel for a bill validator 124, and/or an access channel for a ticket-out printer 126.

In FIG. 1, gaming device 104A is shown as a Relm XL™ model gaming device manufactured by Aristocrat® Technologies, Inc. As shown, gaming device 104A is a reel machine having a gaming display area 118 comprising a number (typically 3 or 5) of mechanical reels 130 with various symbols displayed on them. The mechanical reels 130 are independently spun and stopped to show a set of symbols within the gaming display area 118 which may be used to determine an outcome to the game.

In many configurations, the gaming device 104A may have a main display 128 (e.g., video display monitor) mounted to, or above, the gaming display area 118. The main display 128 can be a high-resolution liquid crystal display (LCD), plasma, light emitting diode (LED), or organic light emitting diode (OLED) panel which may be flat or curved as shown, a cathode ray tube, or other conventional electronically controlled video monitor.

In some implementations, the bill validator 124 may also function as a "ticket-in" reader that allows the player to use a casino issued credit ticket to load credits onto the gaming device 104A (e.g., in a cashless ticket ("TITO") system). In such cashless implementations, the gaming device 104A may also include a "ticket-out" printer 126 for outputting a credit ticket when a "cash out" button is pressed. Cashless TITO systems are used to generate and track unique barcodes or other indicators printed on tickets to allow players to avoid the use of bills and coins by loading credits using a ticket reader and cashing out credits using a ticket-out printer 126 on the gaming device 104A. The gaming device 104A can have hardware meters for purposes including ensuring regulatory compliance and monitoring the player credit balance. In addition, there can be additional meters that record the total amount of money wagered on the gaming device, total amount of money deposited, total amount of money withdrawn, total amount of winnings on gaming device 104A.

In some implementations, a player tracking card reader 144, a transceiver for wireless communication with a mobile device (e.g., a player's smartphone), a keypad 146, and/or an illuminated display 148 for reading, receiving, entering, and/or displaying player tracking information is provided in gaming device 104A. In such implementations, a game controller within the gaming device 104A can communicate with the player tracking system server 110 to send and receive player tracking information.

Gaming device 104A may also include a bonus topper wheel 134. When bonus play is triggered (e.g., by a player achieving a particular outcome or set of outcomes in the primary game), bonus topper wheel 134 is operative to spin and stop with indicator arrow 136 indicating the outcome of the bonus game. Bonus topper wheel 134 is typically used to play a bonus game, but it could also be incorporated into play of the base or primary game.

A candle 138 may be mounted on the top of gaming device 104A and may be activated by a player (e.g., using a switch or one of buttons 122) to indicate to operations staff that gaming device 104A has experienced a malfunction or the player requires service. The candle 138 is also often used to indicate a jackpot has been won and to alert staff that a hand payout of an award may be needed.

There may also be one or more information panels 152 which may be a back-lit, silkscreened glass panel with lettering to indicate general game information including, for example, a game denomination (e.g., $0.25 or $1), pay lines, pay tables, and/or various game related graphics. In some implementations, the information panel(s) 152 may be implemented as an additional video display.

Gaming devices 104A have traditionally also included a handle 132 typically mounted to the side of main cabinet 116 which may be used to initiate game play.

Figure 2A:
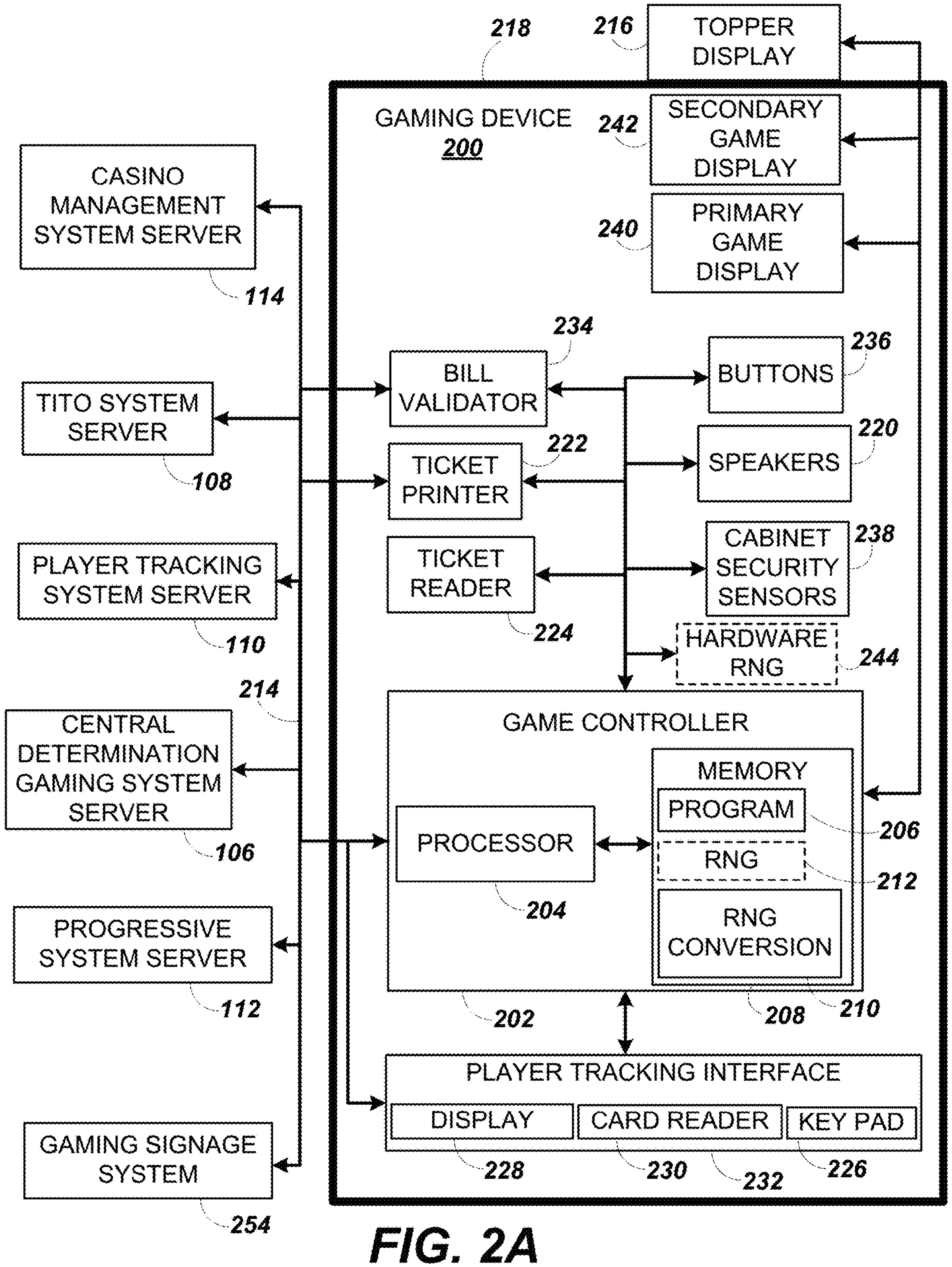
FIG. 2A is a block diagram showing various functional elements of an exemplary EGM.

Many or all the above described components can be controlled by circuitry (e.g., a game controller) housed inside the main cabinet 116 of the gaming device 104A, the details of which are shown in FIG. 2A.

An alternative example gaming device 104B illustrated in FIG. 1 is the Arc™ model gaming device manufactured by Aristocrat® Technologies, Inc. Note that where possible, reference numerals identifying similar features of the gaming device 104A implementation are also identified in the gaming device 104B implementation using the same reference numbers. Gaming device 104B does not include physical reels and instead shows game play functions on main display 128. An optional topper screen 140 may be used as a secondary game display for bonus play, to show game features or attraction activities while a game is not in play, or any other information or media desired by the game designer or operator. In some implementations, the optional topper screen 140 may also or alternatively be used to display progressive jackpot prizes available to a player during play of gaming device 104B.

Example gaming device 104B includes a main cabinet 116 including a main door which opens to provide access to the interior of the gaming device 104B. The main or service door is typically used by service personnel to refill the ticket-out printer 126 and collect bills and tickets inserted into the bill validator 124. The main or service door may also be accessed to reset the machine, verify and/or upgrade the software, and for general maintenance operations.

Another example gaming device 104C shown is the Helix™ model gaming device manufactured by Aristocrat® Technologies, Inc. Gaming device 104C includes a main display 128A that is in a landscape orientation. Although not illustrated by the front view provided, the main display 128A may have a curvature radius from top to bottom, or alternatively from side to side. In some implementations, main display 128A is a flat panel display. Main display 128A is typically used for primary game play while secondary display 128B is typically used for bonus game play, to show game features or attraction activities while the game is not in play or any other information or media desired by the game designer or operator. In some implementations, example gaming device 104C may also include speakers 142 to output various audio such as game sound, background music, etc.

Many different types of games, including mechanical slot games, video slot games, video poker, video black jack, video pachinko, keno, bingo, and lottery, may be provided with or implemented within the depicted gaming devices 104A-104C and other similar gaming devices. Each gaming device may also be operable to provide many different games. Games may be differentiated according to themes, sounds, graphics, type of game (e.g., slot game vs. card game vs. game with aspects of skill), denomination, number of paylines, maximum jackpot, progressive or non-progressive, bonus games, and may be deployed for operation in Class 2 or Class 3, etc.

FIG. 2A is a block diagram depicting exemplary internal electronic components of a gaming device 200 connected to various external systems. All or parts of the gaming device 200 shown could be used to implement any one of the example gaming devices 104A-X depicted in FIG. 1. As shown in FIG. 2A, gaming device 200 includes a topper display 216 or another form of a top box (e.g., a topper wheel, a topper screen, etc.) that sits above cabinet 218. Cabinet 218 or topper display 216 may also house a number of other components which may be used to add features to a game being played on gaming device 200, including speakers 220, a ticket printer 222 which prints bar-coded tickets or other media or mechanisms for storing or indicating a player's credit value, a ticket reader 224 which reads bar-coded tickets or other media or mechanisms for storing or indicating a player's credit value, and a player tracking interface 232. Player tracking interface 232 may include a keypad 226 for entering information, a player tracking display 228 for displaying information (e.g., an illuminated or video display), a card reader 230 for receiving data and/or communicating information to and from media or a device such as a smart phone enabling player tracking. FIG. 2 also depicts utilizing a ticket printer 222 to print tickets for a TITO system server 108. Gaming device 200 may further include a bill validator 234, player-input buttons 236 for player input, cabinet security sensors 238 to detect unauthorized opening of the cabinet 218, a primary game display 240, and a secondary game display 242, each coupled to and operable under the control of game controller 202.

The games available for play on the gaming device 200 are controlled by a game controller 202 that includes one or more processors 204. Processor 204 represents a general-purpose processor, a specialized processor intended to perform certain functional tasks, or a combination thereof. As an example, processor 204 can be a central processing unit (CPU) that has one or more multi-core processing units and memory mediums (e.g., cache memory) that function as buffers and/or temporary storage for data. Alternatively, processor 204 can be a specialized processor, such as an application specific integrated circuit (ASIC), graphics processing unit (GPU), field-programmable gate array (FPGA), digital signal processor (DSP), or another type of hardware accelerator. In another example, processor 204 is a system on chip (SoC) that combines and integrates one or more general-purpose processors and/or one or more specialized processors. Although FIG. 2A illustrates that game controller 202 includes a single processor 204, game controller 202 is not limited to this representation and instead can include multiple processors 204 (e.g., two or more processors).

FIG. 2A illustrates that processor 204 is operatively coupled to memory 208. Memory 208 is defined herein as including volatile and nonvolatile memory and other types of non-transitory data storage components. Volatile memory is memory that do not retain data values upon loss of power. Nonvolatile memory is memory that do retain data upon a loss of power. Examples of memory 208 include random access memory (RAM), read-only memory (ROM), hard disk drives, solid-state drives, universal serial bus (USB) flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, examples of RAM include static random access memory (SRAM), dynamic random access memory (DRAM), magnetic random access memory (MRAM), and other such devices. Examples of ROM include a programmable read-only memory (PROM), an erasable programmable read-only memory (EPROM), an electrically erasable programmable read-only memory (EEPROM), or other like memory device. Even though FIG. 2A illustrates that game controller 202 includes a single memory 208, game controller 202 could include multiple memories 208 for storing program instructions and/or data.

Memory 208 can store one or more game programs 206 that provide program instructions and/or data for carrying out various implementations (e.g., game mechanics)

described herein. Stated another way, game program 206 represents an executable program stored in any portion or component of memory 208. In one or more implementations, game program 206 is embodied in the form of source code that includes human-readable statements written in a programming language or machine code that contains numerical instructions recognizable by a suitable execution system, such as a processor 204 in a game controller or other system. Examples of executable programs include: (1) a compiled program that can be translated into machine code in a format that can be loaded into a random access portion of memory 208 and run by processor 204; (2) source code that may be expressed in proper format such as object code that is capable of being loaded into a random access portion of memory 208 and executed by processor 204; and (3) source code that may be interpreted by another executable program to generate instructions in a random access portion of memory 208 to be executed by processor 204.

Alternatively, game programs 206 can be set up to generate one or more game instances based on instructions and/or data that gaming device 200 exchanges with one or more remote gaming devices, such as a central determination gaming system server 106 (not shown in FIG. 2A but shown in FIG. 1). For purpose of this disclosure, the term "game instance" refers to a play or a round of a game that gaming device 200 presents (e.g., via a user interface (UI)) to a player. The game instance is communicated to gaming device 200 via the network 214 and then displayed on gaming device 200. For example, gaming device 200 may execute game program 206 as video streaming software that allows the game to be displayed on gaming device 200. When a game is stored on gaming device 200, it may be loaded from memory 208 (e.g., from a read only memory (ROM)) or from the central determination gaming system server 106 to memory 208.

Gaming devices, such as gaming device 200, are highly regulated to ensure fairness and, in many cases, gaming device 200 is operable to award monetary awards (e.g., typically dispensed in the form of a redeemable voucher). Therefore, to satisfy security and regulatory requirements in a gaming environment, hardware and software architectures are implemented in gaming devices 200 that differ significantly from those of general-purpose computers. Adapting general purpose computers to function as gaming devices 200 is not simple or straightforward because of: (1) the regulatory requirements for gaming devices 200, (2) the harsh environment in which gaming devices 200 operate, (3) security requirements, (4) fault tolerance requirements, and (5) the requirement for additional special purpose componentry enabling functionality of an EGM. These differences require substantial engineering effort with respect to game design implementation, game mechanics, hardware components, and software.

One regulatory requirement for games running on gaming device 200 generally involves complying with a certain level of randomness. Typically, gaming jurisdictions mandate that gaming devices 200 satisfy a minimum level of randomness without specifying how a gaming device 200 should achieve this level of randomness. To comply, FIG. 2A illustrates that gaming device 200 could include an RNG 212 that utilizes hardware and/or software to generate RNG outcomes that lack any pattern. The RNG operations are often specialized and non-generic in order to comply with regulatory and gaming requirements. For example, in a slot game, game program 206 can initiate multiple RNG calls to RNG 212 to generate RNG outcomes, where each RNG call and RNG outcome corresponds to an outcome for a reel. In another example, gaming device 200 can be a Class II gaming device where RNG 212 generates RNG outcomes for creating Bingo cards. In one or more implementations, RNG 212 could be one of a set of RNGs operating on gaming device 200. More generally, an output of the RNG 212 can be the basis on which game outcomes are determined by the game controller 202. Game developers could vary the degree of true randomness for each RNG (e.g., pseudorandom) and utilize specific RNGs depending on game requirements. The output of the RNG 212 can include a random number or pseudorandom number (either is generally referred to as a "random number").

In FIG. 2A, RNG 212 and hardware RNG 244 are shown in dashed lines to illustrate that RNG 212, hardware RNG 244, or both can be included in gaming device 200. In one implementation, instead of including RNG 212, gaming device 200 could include a hardware RNG 244 that generates RNG outcomes. Analogous to RNG 212, hardware RNG 244 performs specialized and non-generic operations in order to comply with regulatory and gaming requirements. For example, because of regulation requirements, hardware RNG 244 could be a random number generator that securely produces random numbers for cryptography use. The gaming device 200 then uses the secure random numbers to generate game outcomes for one or more game features. In another implementation, the gaming device 200 could include both hardware RNG 244 and RNG 212. RNG 212 may utilize the RNG outcomes from hardware RNG 244 as one of many sources of entropy for generating secure random numbers for the game features.

Another regulatory requirement for running games on gaming device 200 includes ensuring a certain level of RTP. Similar to the randomness requirement discussed above, numerous gaming jurisdictions also mandate that gaming device 200 provides a minimum level of RTP (e.g., RTP of at least 75%). A game can use one or more lookup tables (also called weighted tables) as part of a technical solution that satisfies regulatory requirements for randomness and RTP. In particular, a lookup table can integrate game features (e.g., trigger events for special modes or bonus games; newly introduced game elements such as extra reels, new symbols, or new cards; stop positions for dynamic game elements such as spinning reels, spinning wheels, or shifting reels; or card selections from a deck) with random numbers generated by one or more RNGs, so as to achieve a given level of volatility for a target level of RTP. (In general, volatility refers to the frequency or probability of an event such as a special mode, payout, etc. For example, for a target level of RTP, a higher-volatility game may have a lower payout most of the time with an occasional bonus having a very high payout, while a lower-volatility game has a steadier payout with more frequent bonuses of smaller amounts.) Configuring a lookup table can involve engineering decisions with respect to how RNG outcomes are mapped to game outcomes for a given game feature, while still satisfying regulatory requirements for RTP. Configuring a lookup table can also involve engineering decisions about whether different game features are combined in a given entry of the lookup table or split between different entries (for the respective game features), while still satisfying regulatory requirements for RTP and allowing for varying levels of game volatility.

FIG. 2A illustrates that gaming device 200 includes an RNG conversion engine 210 that translates the RNG outcome from RNG 212 to a game outcome presented to a player. To meet a designated RTP, a game developer can set up the RNG conversion engine 210 to utilize one or more lookup tables to translate the RNG outcome to a symbol element, stop position on a reel strip layout, and/or randomly chosen aspect of a game feature. As an example, the lookup tables can regulate a prize payout amount for each RNG outcome and how often the gaming device 200 pays out the prize payout amounts. The RNG conversion engine 210 could utilize one lookup table to map the RNG outcome to a game outcome displayed to a player and a second lookup table as a pay table for determining the prize payout amount for each game outcome. The mapping between the RNG outcome to the game outcome controls the frequency in hitting certain prize payout amounts.

FIG. 2A also depicts that gaming device 200 is connected over network 214 to player tracking system server 110. Player tracking system server 110 may be, for example, an OASIS® system manufactured by Aristocrat® Technologies, Inc. Player tracking system server 110 is used to track play (e.g. amount wagered, games played, time of play and/or other quantitative or qualitative measures) for individual players so that an operator may reward players in a loyalty program. The player may use the player tracking interface 232 to access his/her account information, activate free play, and/or request various information. Player tracking or loyalty programs seek to reward players for their play and help build brand loyalty to the gaming establishment. The rewards typically correspond to the player's level of patronage (e.g., to the player's playing frequency and/or total amount of game plays at a given casino). Player tracking rewards may be complimentary and/or discounted meals, lodging, entertainment and/or additional play. Player tracking information may be combined with other information that is now readily obtainable by a casino management system.

When a player wishes to play the gaming device 200, he/she can insert cash or a ticket voucher through a coin acceptor (not shown) or bill validator 234 to establish a credit balance on the gaming device. The credit balance is used by the player to place wagers on instances of the game and to receive credit awards based on the outcome of winning instances. The credit balance is decreased by the amount of each wager and increased upon a win. The player can add additional credits to the balance at any time. The player may also optionally insert a loyalty club card into the card reader 230. During the game, the player views with one or more UIs, the game outcome on one or more of the primary game display 240 and secondary game display 242. Other game and prize information may also be displayed.

For each game instance, a player may make selections, which may affect play of the game. For example, the player may vary the total amount wagered by selecting the amount bet per line and the number of lines played. In many games, the player is asked to initiate or select options during course of game play (such as spinning a wheel to begin a bonus round or select various items during a feature game). The player may make these selections using the player-input buttons 236, the primary game display 240 which may be a touch screen, or using some other device which enables a player to input information into the gaming device 200.

During certain game events, the gaming device 200 may display visual and auditory effects that can be perceived by the player. These effects add to the excitement of a game, which makes a player more likely to enjoy the playing experience. Auditory effects include various sounds that are projected by the speakers 220. Visual effects include flashing lights, strobing lights or other patterns displayed from lights on the gaming device 200 or from lights behind the information panel 152 (FIG. 1).

When the player is done, he/she cashes out the credit balance (typically by pressing a cash out button to receive a ticket from the ticket printer 222). The ticket may be "cashed-in" for money or inserted into another machine to establish a credit balance for play.

Additionally, or alternatively, gaming devices 104A-104X and 200 can include or be coupled to one or more wireless transmitters, receivers, and/or transceivers (not shown in FIGS. 1 and 2A) that communicate (e.g., Bluetooth® or other near-field communication technology) with one or more mobile devices to perform a variety of wireless operations in a casino environment. Examples of wireless operations in a casino environment include detecting the presence of mobile devices, performing credit, points, comps, or other marketing or hard currency transfers, establishing wagering sessions, and/or providing a personalized casino-based experience using a mobile application. In one implementation, to perform these wireless operations, a wireless transmitter or transceiver initiates a secure wireless connection between a gaming device 104A-104X and 200 and a mobile device. After establishing a secure wireless connection between the gaming device 104A-104X and 200 and the mobile device, the wireless transmitter or transceiver does not send and/or receive application data to and/or from the mobile device. Rather, the mobile device communicates with gaming devices 104A-104X and 200 using another wireless connection (e.g., WiFi® or cellular network). In another implementation, a wireless transceiver establishes a secure connection to directly communicate with the mobile device. The mobile device and gaming device 104A-104X and 200 sends and receives data utilizing the wireless transceiver instead of utilizing an external network. For example, the mobile device would perform digital wallet transactions by directly communicating with the wireless transceiver. In one or more implementations, a wireless transmitter could broadcast data received by one or more mobile devices without establishing a pairing connection with the mobile devices.

Although FIGS. 1 and 2A illustrate specific implementations of a gaming device (e.g., gaming devices 104A-104X and 200), the disclosure is not limited to those implementations shown in FIGS. 1 and 2. For example, not all gaming devices suitable for implementing implementations of the present disclosure necessarily include top wheels, top boxes, information panels, cashless ticket systems, and/or player tracking systems. Further, some suitable gaming devices have only a single game display that includes only a mechanical set of reels and/or a video display, while others are designed for bar counters or tabletops and have displays that face upwards. Gaming devices 104A-104X and 200 may also include other processors that are not separately shown. Using FIG. 2A as an example, gaming device 200 could include display controllers (not shown in FIG. 2A) configured to receive video input signals or instructions to display images on game displays 240 and 242. Alternatively, such display controllers may be integrated into the game controller 202. The use and discussion of FIGS. 1 and 2 are examples to facilitate ease of description and explanation.

Figure 2B:
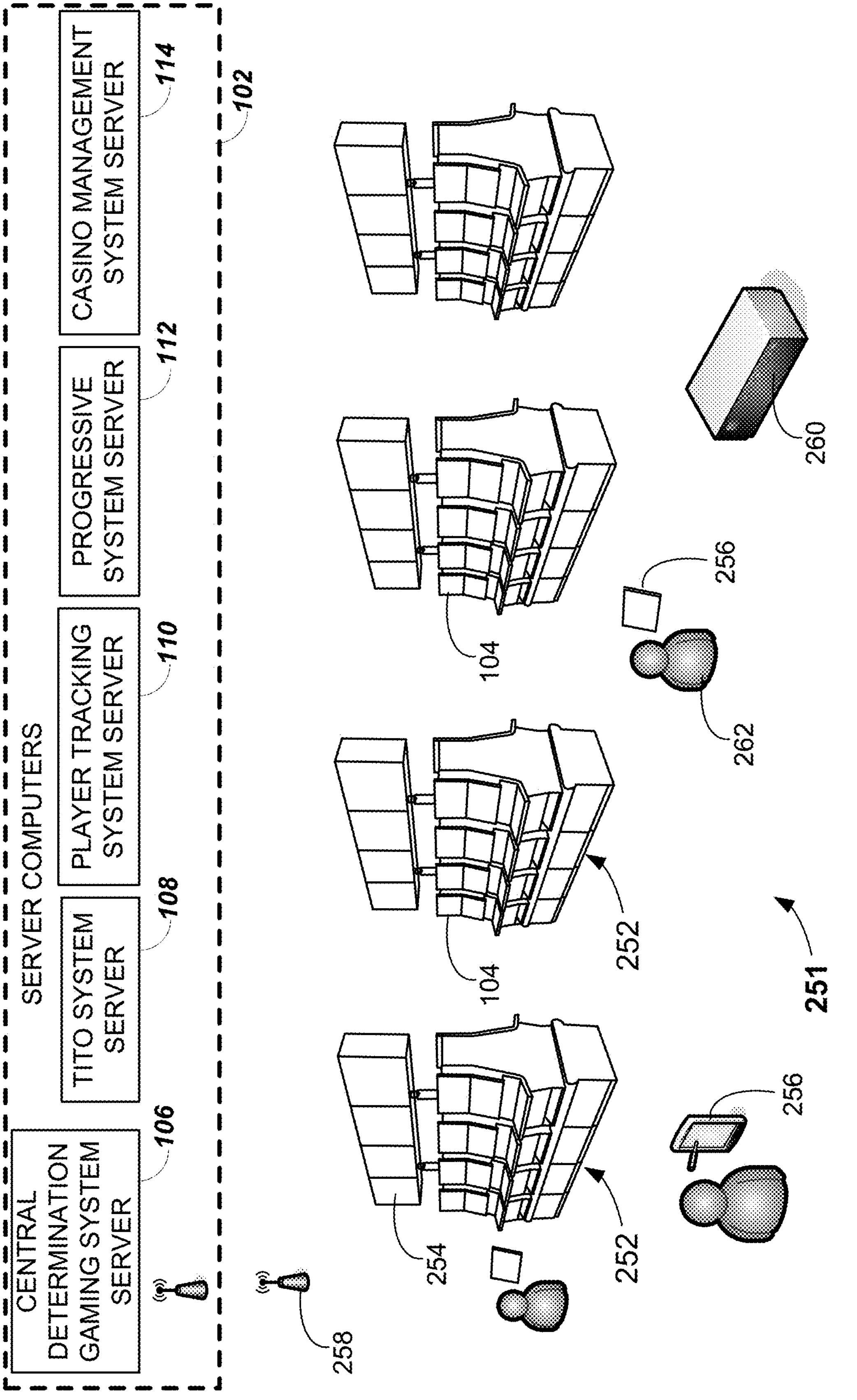
FIG. 2B depicts a casino gaming environment according to one example.

FIG. 2B depicts a casino gaming environment according to one example. In this example, the casino 251 includes banks 252 of EGMs 104. In this example, each bank 252 of EGMs 104 includes a corresponding gaming signage system 254 (also shown in FIG. 2A). According to this implementation, the casino 251 also includes mobile gaming devices 256, which are also configured to present wagering games in this example. The mobile gaming devices 256 may, for example, include tablet devices, cellular phones, smart phones and/or other handheld devices. In this example, the mobile gaming devices 256 are configured for communication with one or more other devices in the casino 251, including but not limited to one or more of the server computers 102, via wireless access points 258.

According to some examples, the mobile gaming devices 256 may be configured for stand-alone determination of game outcomes. However, in some alternative implementations the mobile gaming devices 256 may be configured to receive game outcomes from another device, such as the central determination gaming system server 106, one of the EGMs 104, etc.

Some mobile gaming devices 256 may be configured to accept monetary credits from a credit or debit card, via a wireless interface (e.g., via a wireless payment app), via tickets, via a patron casino account, etc. However, some mobile gaming devices 256 may not be configured to accept monetary credits via a credit or debit card. Some mobile gaming devices 256 may include a ticket reader and/or a ticket printer whereas some mobile gaming devices 256 may not, depending on the particular implementation.

In some implementations, the casino 251 may include one or more kiosks 260 that are configured to facilitate monetary transactions involving the mobile gaming devices 256, which may include cash out and/or cash in transactions. The kiosks 260 may be configured for wired and/or wireless communication with the mobile gaming devices 256. The kiosks 260 may be configured to accept monetary credits from casino patrons 262 and/or to dispense monetary credits to casino patrons 262 via cash, a credit or debit card, via a wireless interface (e.g., via a wireless payment app), via tickets, etc. According to some examples, the kiosks 260 may be configured to accept monetary credits from a casino patron and to provide a corresponding amount of monetary credits to a mobile gaming device 256 for wagering purposes, e.g., via a wireless link such as a near-field communications link. In some such examples, when a casino patron 262 is ready to cash out, the casino patron 262 may select a cash out option provided by a mobile gaming device 256, which may include a real button or a virtual button (e.g., a button provided via a graphical user interface) in some instances. In some such examples, the mobile gaming device 256 may send a "cash out" signal to a kiosk 260 via a wireless link in response to receiving a "cash out" indication from a casino patron. The kiosk 260 may provide monetary credits to the casino patron 262 corresponding to the "cash out" signal, which may be in the form of cash, a credit ticket, a credit transmitted to a financial account corresponding to the casino patron, etc.

In some implementations, a cash-in process and/or a cash-out process may be facilitated by the TITO system server 108. For example, the TITO system server 108 may control, or at least authorize, ticket-in and ticket-out transactions that involve a mobile gaming device 256 and/or a kiosk 260.

Some mobile gaming devices 256 may be configured for receiving and/or transmitting player loyalty information. For example, some mobile gaming devices 256 may be configured for wireless communication with the player tracking system server 110. Some mobile gaming devices 256 may be configured for receiving and/or transmitting player loyalty information via wireless communication with a patron's player loyalty card, a patron's smartphone, etc.

According to some implementations, a mobile gaming device 256 may be configured to provide safeguards that prevent the mobile gaming device 256 from being used by an unauthorized person. For example, some mobile gaming devices 256 may include one or more biometric sensors and may be configured to receive input via the biometric sensor(s) to verify the identity of an authorized patron. Some mobile gaming devices 256 may be configured to function only within a predetermined or configurable area, such as a casino gaming area.

Figure 2C:
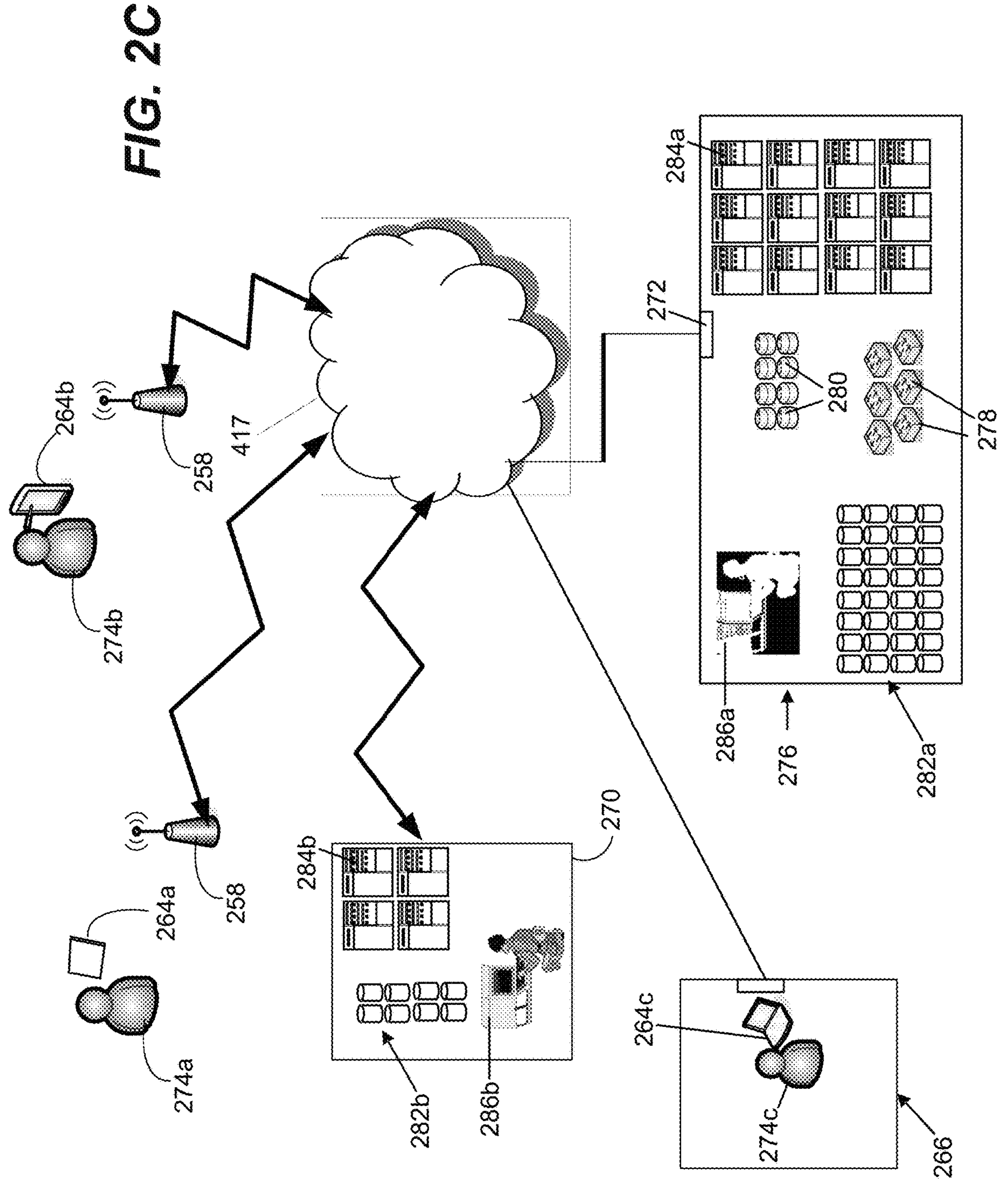
FIG. 2C is a diagram that shows examples of components of a system for providing online gaming according to some aspects of the present disclosure.

FIG. 2C is a diagram that shows examples of components of a system for providing online gaming according to some aspects of the present disclosure. As with other figures presented in this disclosure, the numbers, types and arrangements of gaming devices shown in FIG. 2C are merely shown by way of example. In this example, various gaming devices, including but not limited to end user devices (EUDs) 264*a*, 264*b* and 264*c* are capable of communication via one or more networks 417. The networks 417 may, for example, include one or more cellular telephone networks, the Internet, etc. In this example, the EUDs 264*a* and 264*b* are mobile devices: according to this example the EUD 264*a* is a tablet device and the EUD 264*b* is a smart phone. In this implementation, the EUD 264*c* is a laptop computer that is located within a residence 266 at the time depicted in FIG. 2C. Accordingly, in this example the hardware of EUDs is not specifically configured for online gaming, although each EUD is configured with software for online gaming. For example, each EUD may be configured with a web browser. Other implementations may include other types of EUD, some of which may be specifically configured for online gaming.

In this example, a gaming data center 276 includes various devices that are configured to provide online wagering games via the networks 417. The gaming data center 276 is capable of communication with the networks 417 via the gateway 272. In this example, switches 278 and routers 280 are configured to provide network connectivity for devices of the gaming data center 276, including storage devices 282*a*, servers 284*a* and one or more workstations 570*a*. The servers 284*a* may, for example, be configured to provide access to a library of games for online game play. In some examples, code for executing at least some of the games may initially be stored on one or more of the storage devices 282*a*. The code may be subsequently loaded onto a server 284*a* after selection by a player via an EUD and communication of that selection from the EUD via the networks 417. The server 284*a* onto which code for the selected game has been loaded may provide the game according to selections made by a player and indicated via the player's EUD. In other examples, code for executing at least some of the games may initially be stored on one or more of the servers 284*a*. Although only one gaming data center 276 is shown in FIG. 2C, some implementations may include multiple gaming data centers 276.

In this example, a financial institution data center 270 is also configured for communication via the networks 417. Here, the financial institution data center 270 includes servers 284*b*, storage devices 282*b*, and one or more workstations 286*b*. According to this example, the financial institution data center 270 is configured to maintain financial accounts, such as checking accounts, savings accounts, loan accounts, etc. In some implementations one or more of the authorized users 274*a*-274*c* may maintain at least one financial account with the financial institution that is serviced via the financial institution data center 270.

According to some implementations, the gaming data center 276 may be configured to provide online wagering games in which money may be won or lost. According to some such implementations, one or more of the servers 284*a* may be configured to monitor player credit balances, which may be expressed in game credits, in currency units, or in any other appropriate manner. In some implementations, the server(s) 284*a* may be configured to obtain financial credits from and/or provide financial credits to one or more financial institutions, according to a player's "cash in" selections, wagering game results and a player's "cash out" instructions. According to some such implementations, the server(s) 284*a* may be configured to electronically credit or debit the account of a player that is maintained by a financial institution, e.g., an account that is maintained via the financial institution data center 270. The server(s) 284*a* may, in some examples, be configured to maintain an audit record of such transactions.

In some alternative implementations, the gaming data center 276 may be configured to provide online wagering games for which credits may not be exchanged for cash or the equivalent. In some such examples, players may purchase game credits for online game play, but may not "cash out" for monetary credit after a gaming session. Moreover, although the financial institution data center 270 and the gaming data center 276 include their own servers and storage devices in this example, in some examples the financial institution data center 270 and/or the gaming data center 276 may use offsite "cloud-based" servers and/or storage devices. In some alternative examples, the financial institution data center 270 and/or the gaming data center 276 may rely entirely on cloud-based servers.

One or more types of devices in the gaming data center 276 (or elsewhere) may be capable of executing middleware, e.g., for data management and/or device communication. Authentication information, player tracking information, etc., including but not limited to information obtained by EUDs 264 and/or other information regarding authorized users of EUDs 264 (including but not limited to the authorized users 274*a*-274*c*), may be stored on storage devices 282 and/or servers 284. Other game-related information and/or software, such as information and/or software relating to leaderboards, players currently playing a game, game themes, game-related promotions, game competitions, etc., also may be stored on storage devices 282 and/or servers 284. In some implementations, some such game-related software may be available as "apps" and may be downloadable (e.g., from the gaming data center 276) by authorized users.

In some examples, authorized users and/or entities (such as representatives of gaming regulatory authorities) may obtain gaming-related information via the gaming data center 276. One or more other devices (such EUDs 264 or devices of the gaming data center 276) may act as intermediaries for such data feeds. Such devices may, for example, be capable of applying data filtering algorithms, executing data summary and/or analysis software, etc. In some implementations, data filtering, summary and/or analysis software may be available as "apps" and downloadable by authorized users.

Figure 3A:
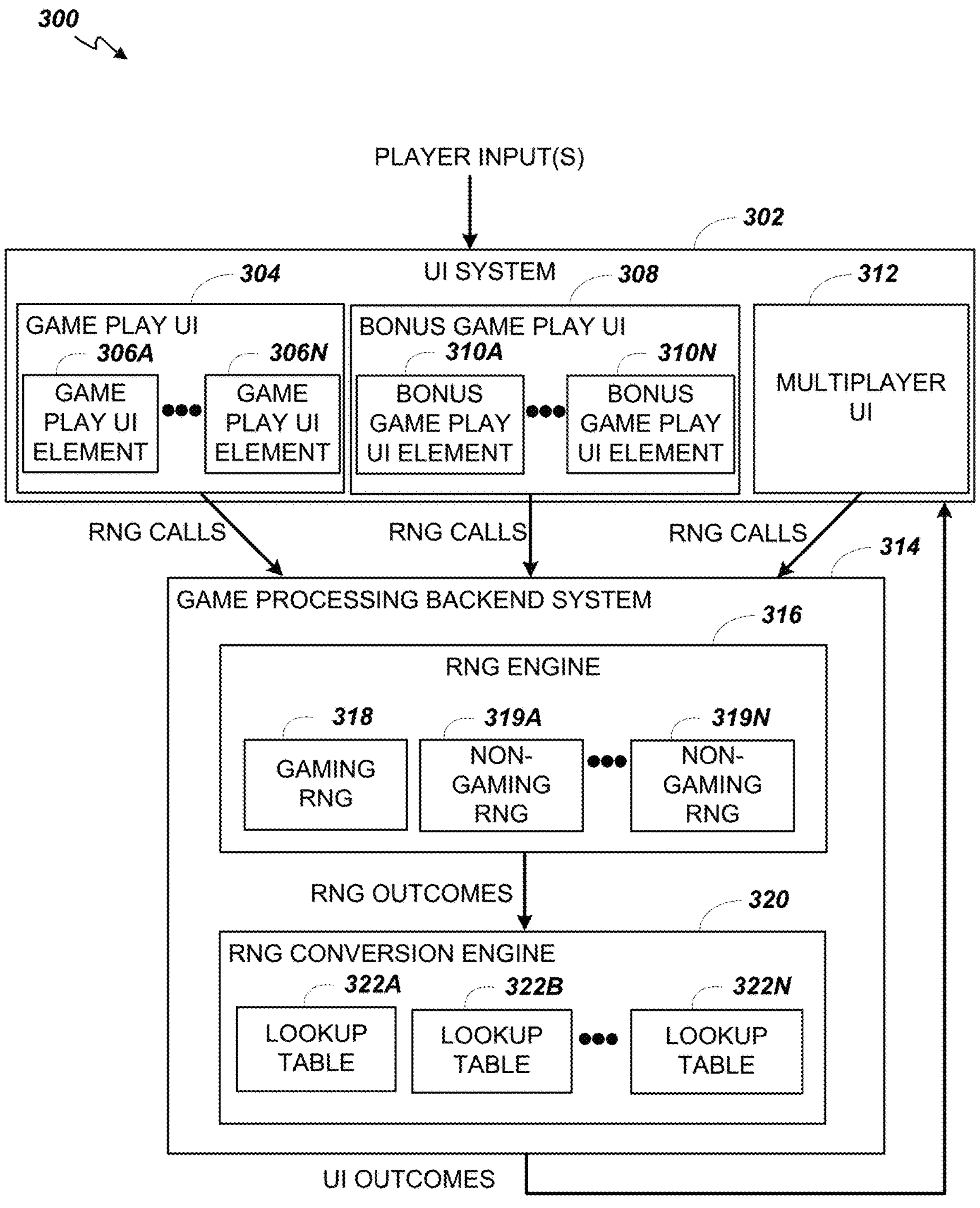
FIG. 3A illustrates, in block diagram form, an implementation of a game processing architecture algorithm that implements a game processing pipeline for the play of a game in accordance with various implementations described herein.

FIG. 3A illustrates, in block diagram form, an implementation of a game processing architecture 300 that implements a game processing pipeline for the play of a game in accordance with various implementations described herein. As shown in FIG. 3A, the gaming processing pipeline starts with having a UI system 302 receive one or more player inputs for the game instance. Based on the player input(s), the UI system 302 generates and sends one or more RNG calls to a game processing backend system 314. Game processing backend system 314 then processes the RNG calls with RNG engine 316 to generate one or more RNG outcomes. The RNG outcomes are then sent to the RNG conversion engine 320 to generate one or more game outcomes for the UI system 302 to display to a player. The game processing architecture 300 can implement the game processing pipeline using a gaming device, such as gaming devices 104A-104X and 200 shown in FIGS. 1 and 2, respectively. Alternatively, portions of the gaming processing architecture 300 can implement the game processing pipeline using a gaming device and one or more remote gaming devices, such as central determination gaming system server 106 shown in FIG. 1.

The UI system 302 includes one or more UIs that a player can interact with. The UI system 302 could include one or more game play UIs 304, one or more bonus game play UIs 308, and one or more multiplayer UIs 312, where each UI type includes one or more mechanical UIs and/or graphical UIs (GUIs). In other words, game play UI 304, bonus game play UI 308, and the multiplayer UI 312 may utilize a variety of UI elements, such as mechanical UI elements (e.g., physical "spin" button or mechanical reels) and/or GUI elements (e.g., virtual reels shown on a video display or a virtual button deck) to receive player inputs and/or present game play to a player. Using FIG. 3A as an example, the different UI elements are shown as game play UI elements 306A-306N and bonus game play UI elements 310A-310N.

The game play UI 304 represents a UI that a player typically interfaces with for a base game. During a game instance of a base game, the game play UI elements 306A-306N (e.g., GUI elements depicting one or more virtual reels) are shown and/or made available to a user. In a subsequent game instance, the UI system 302 could transition out of the base game to one or more bonus games. The bonus game play UI 308 represents a UI that utilizes bonus game play UI elements 310A-310N for a player to interact with and/or view during a bonus game. In one or more implementations, at least some of the game play UI elements 306A-306N are similar to the bonus game play UI elements 310A-310N. In other implementations, the game play UI element 306A-306N can differ from the bonus game play UI elements 310A-310N.

FIG. 3A also illustrates that UI system 302 could include a multiplayer UI 312 purposed for game play that differs or is separate from the typical base game. For example, multiplayer UI 312 could be set up to receive player inputs and/or presents game play information relating to a tournament mode. When a gaming device transitions from a primary game mode that presents the base game to a tournament mode, a single gaming device is linked and synchronized to other gaming devices to generate a tournament outcome. For example, multiple RNG engines 316 corresponding to each gaming device could be collectively linked to determine a tournament outcome. To enhance a player's gaming experience, tournament mode can modify and synchronize sound, music, reel spin speed, and/or other operations of the gaming devices according to the tournament game play. After tournament game play ends, operators can switch back the gaming device from tournament mode to a primary game mode to present the base game. Although FIG. 3A does not explicitly depict that multiplayer UI 312 includes UI elements, multiplayer UI 312 could also include one or more multiplayer UI elements.

Based on the player inputs, the UI system 302 could generate RNG calls to a game processing backend system 314. As an example, the UI system 302 could use one or more application programming interfaces (APIs) to generate the RNG calls. To process the RNG calls, the RNG engine 316 could utilize gaming RNG 318 and/or non-gaming RNGs 319A-319N. Gaming RNG 318 could correspond to RNG 212 or hardware RNG 244 shown in FIG. 2A. As previously discussed with reference to FIG. 2A, gaming RNG 318 often performs specialized and non-generic operations that comply with regulatory and/or game requirements. For example, because of regulation requirements, gaming RNG 318 could correspond to RNG 212 by being a cryptographic RNG or pseudorandom number generator (PRNG) (e.g., Fortuna PRNG) that securely produces random numbers for one or more game features. To securely generate random numbers, gaming RNG 318 could collect random data from various sources of entropy, such as from an operating system (OS) and/or a hardware RNG (e.g., hardware RNG 244 shown in FIG. 2A). Alternatively, non-gaming RNGs 319A-319N may not be cryptographically secure and/or be computationally less expensive. Non-gaming RNGs 319A-319N can, thus, be used to generate outcomes for non-gaming purposes. As an example, non-gaming RNGs 319A-319N can generate random numbers for generating random messages that appear on the gaming device.

The RNG conversion engine 320 processes each RNG outcome from RNG engine 316 and converts the RNG outcome to a UI outcome that is feedback to the UI system 302. With reference to FIG. 2A, RNG conversion engine 320 corresponds to RNG conversion engine 210 used for game play. As previously described, RNG conversion engine 320 translates the RNG outcome from the RNG 212 to a game outcome presented to a player. RNG conversion engine 320 utilizes one or more lookup tables 322A-322N to regulate a prize payout amount for each RNG outcome and how often the gaming device pays out the derived prize payout amounts. In one example, the RNG conversion engine 320 could utilize one lookup table to map the RNG outcome to a game outcome displayed to a player and a second lookup table as a pay table for determining the prize payout amount for each game outcome. In this example, the mapping between the RNG outcome and the game outcome controls the frequency in hitting certain prize payout amounts. Different lookup tables could be utilized depending on the different game modes, for example, a base game versus a bonus game.

After generating the UI outcome, the game processing backend system 314 sends the UI outcome to the UI system 302. Examples of UI outcomes are symbols to display on a video reel or reel stops for a mechanical reel. In one example, if the UI outcome is for a base game, the UI system 302 updates one or more game play UI elements 306A-306N, such as symbols, for the game play UI 304. In another example, if the UI outcome is for a bonus game, the UI system could update one or more bonus game play UI elements 310A-310N (e.g., symbols) for the bonus game play UI 308. In response to updating the appropriate UI, the player may subsequently provide additional player inputs to initiate a subsequent game instance that progresses through the game processing pipeline.

Figure 3B:
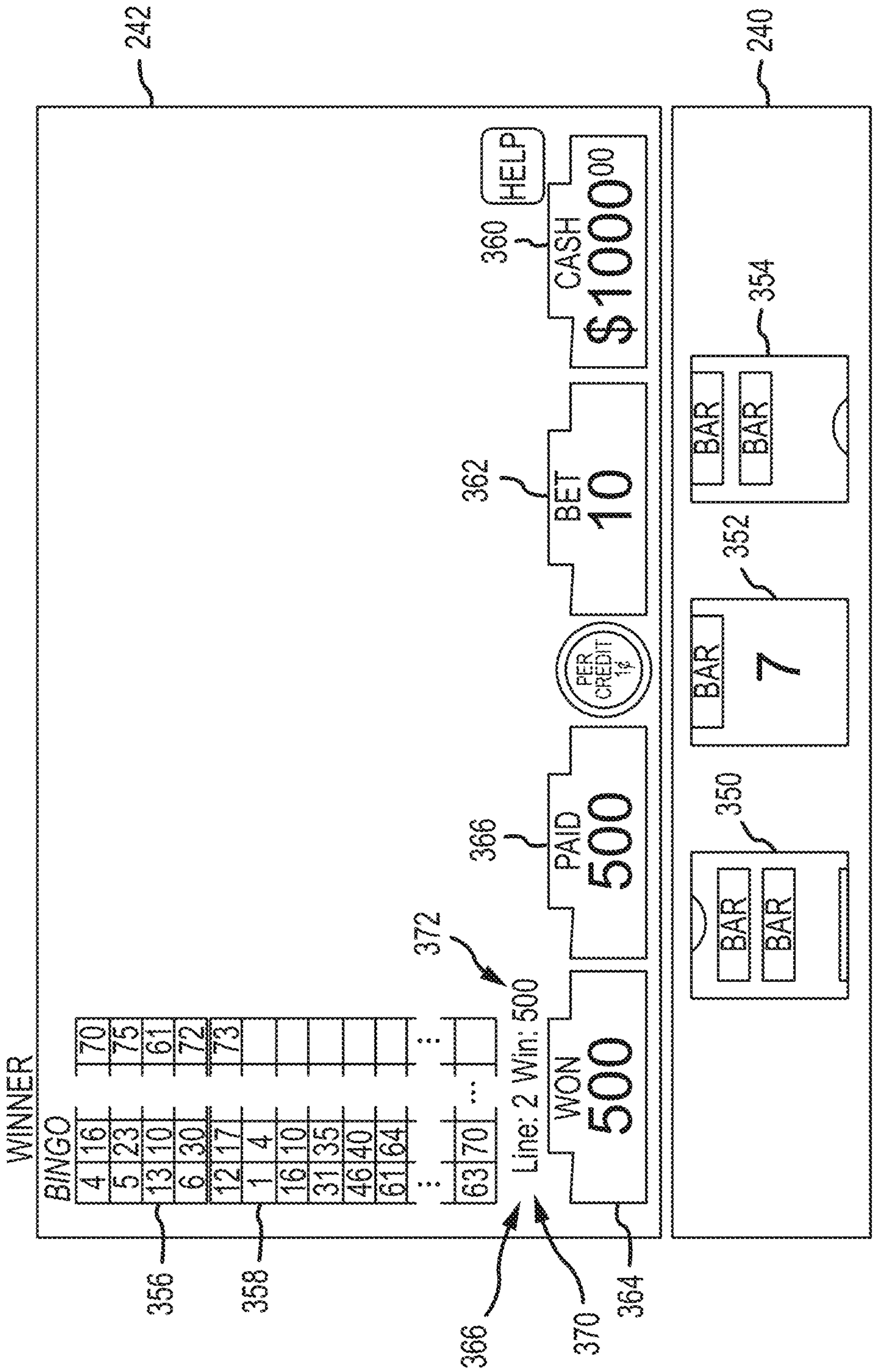
FIG. 3B illustrates a screenshot of an example Class II bingo game being displayed on an EGM as shown in FIG. 1.

FIG. 3B depicts an example of a Class II bingo game being displayed in the primary game display 240 and secondary game display 242 of the EGM 200 of FIG. 2. In the example of FIG. 3B, a plurality of reels 350, 352, and 354 are displayed within the primary game display 240. While only three reels 350, 352, 354 are shown in the example of FIG. 3B, in some examples, more or fewer reels may be used. In some examples, the reels 350, 352, and/or 354 may be implemented as mechanical reels or may include virtual reels that are computer generated and display one a computer display screen. As shown, each reel 350, 352, 354 has a plurality of symbol display positions for presenting symbols (and/or symbol combinations) which may be associated with winning and/or losing reel game outcomes and/or awards.

In the example of FIG. 3B, a bingo card 356 and a bingo number listing 358 are displayed in the secondary game display 242. As shown, the bingo card 356 comprises a matrix of bingo cells 302 (e.g., squares). In some examples, the matrix may be a 5×5 matrix of 25 total cells. In some examples, the bingo card 356 may have a matrix of a different size (e.g., 3×3, 4×4, 4×5, 4×6, 6×6, 7×7, 3×8, 10×10, etc.). In some examples, the matrix may be larger or smaller. In the example of FIG. 3B, each cell 302 in the matrix of the bingo card 356 includes a number that is not repeated in any other cell of the bingo card 356.

In the example of FIG. 3B, the secondary game display 242 further displays a credit meter 360 showing an amount of money and/or credits (e.g., credit balance) held by a player of the EGM 200. In the example of FIG. 3B, the credit balance 360 shows $1000. The secondary display 242 additionally shows a wager meter 362 adjacent to the credit meter 360, under "BET." In the example of FIG. 3B, the amount wagered is 10 credits (e.g., $0.10). The amount wagered (e.g., via the user interface) may be deducted from the credit meter 360. The secondary game display 242 additionally displays a win meter 364 and a total win meter 366. In the example of FIG. 3B, the win meter 364 is 500, indicating that the simulated combination of symbols in reels 350, 352, 354 is associated with a 500 award (which is equal to the awards associated with the bingo game outcome). As shown, the total win meter 366 is also 500, indicating that the cumulative total of awards received comprises just that one 500 credit award. In the example of FIG. 3B, the secondary game display 242 further displays reel win information 368. The reel win information 368 includes win line information 370 and award information 372. The win line information 370 indicates which win line in the reels 350, 352, 354 contains symbols comprising a winning reel game outcome. The award information 372 indicates an associated award amount for that winning reel game outcome.

In some examples, the bingo game may be a networked game that involves two or more networked EGMs 200, such as EGMs 104A-104X. For example, many electronic bingo games may be required, by state gaming regulations, to include at least two players. As a result, in these circumstances, a bingo game can only occur if two or more players have placed wagers and received a bingo card to be used to determine a game outcome against a common ball call. As described in additional detail herein, a ball call is initiated once at least two players have joined an electronic bingo game (e.g., a networked electronic bingo game), and each player's bingo card (or cards) are compared to the same ball call, even where the players are physically separated, such as in different parts of a casino or even in different casinos.

The central determination gaming system server 106 may manage (and/or host) the bingo game, such as by generating the bingo card 356 (or cards, as above) and/or bingo number listing 358. In some examples, the bingo card 356 (and/or information on which the bingo card 356 is based), and/or the bingo number listing 358 may be generated using an RNG. In some examples, the bingo card 356 may be randomly selected from a set of bingo cards or a player may select their own bingo card 356 (e.g., via the user interface), such as from a set of randomly generated bingo cards, for example.

In operation, a player and/or EGM 200 may be provided with a respective bingo card 356, such as by central determination gaming system server 106. For example, a player may be provided a new bingo card 356 each time a "Spin" or "Play" button is pressed by the player (e.g., via user interface), provided the player has made a wager. In some examples, more than one bingo card 356 may be generated in response to a wager. The bingo number listing 358 (e.g., "ball call") may be randomly generated, such as by central determination gaming system server 106. The bingo card 356 may be compared to the current bingo number listing 358, and numbered cells 302 on the bingo card 356 that match numbers in the bingo number listing 358 may be marked or "daubed" on the bingo card 356. Finally, the marked or daubed bingo card 356 may be evaluated against a paytable of winning bingo patterns.

The bingo number listing 358 may be continually generated until a maximum amount of numbers are listed (e.g., seventy-five numbers listed) or until a game-ending pattern is awarded to a player participating in the bingo game. A typical game-ending pattern may be a bingo card blackout pattern, in which each of the numbers of a bingo card match a number displayed in the bingo number listing 358. Other game-ending patterns are also possible. When the game-ending pattern is awarded, the bingo number listing 358 is reset, for all players participating in the bingo game and the process repeats. In some examples, a single play of the bingo game includes a wager, a bingo card, a bingo number listing 358, a matching of the numbers called with those on a bingo card 356, a determination of a bingo game outcome, and a presentation of an associated award, if any.

A bingo game outcome may be determined by comparing one or more patterns of marked (and/or "daubed) cells of the bingo card 356 with the paytable of winning bingo patterns. If the bingo card 356 does not include a pattern that matches a pattern in the paytable of winning patterns, then a losing bingo outcome is determined, and no award may be provided to the player. If the bingo card 356 does include a pattern that matches a pattern in the paytable of winning patterns, then a winning bingo outcome is determined, and a reward may be provided to the player.

Different winning patterns may be associated with different awards. The award for a winning main bingo game outcome may be based on an amount wagered, an associated main bingo game paytable, an associated set of rules for the main bingo game, a probability (and/or likelihood) of achieving a particular bingo pattern/combination, an amount of bingo numbers needed to achieve the particular bingo pattern/combination, and/or other considerations. In some examples, the player may be awarded for multiple patterns (e.g., all winning patterns) that are matched when the bingo card 356 is evaluated against the paytable of winning patterns. In some examples, the player may be awarded for only the highest priority pattern (e.g., the highest paying winning pattern) that is matched. In some examples, during play of a Class II game, a player is provided or selects a single bingo card 356 for multiple plays of the bingo game, with a new bingo number listing 358 generated for each play of the bingo game. Other methods of play of a Class II bingo game are also possible and are within the scope of this disclosure.

The bingo game outcome may be presented to the player via a spinning reel game simulation. In the example of FIG. 3B, the spinning reel game is simulated via the plurality of reels 350, 352 and 354 in the primary game display 240. For each play of the bingo game, the bingo game outcome is presented as a reel spin outcome in the reel game. In some examples, the spinning reel game simulation may operate by spinning each reel 350, 352, 354 and then stopping each reel 350, 352, 354 in a particular position to obtain a matrix of symbols. One or more combinations of symbols in the matrix of symbols may be associated with a reel game outcome that is equal to the main bingo game outcome. For example, a winning bingo game outcome may be displayed as a winning combination of reels 350, 352 and 354. Similarly, a losing bingo game outcome may be displayed as a losing combination of reels 350, 352 and 354. Different outcomes of the bingo game may be displayed as different outcomes in the spinning reel game. Thus, the bingo game outcome is presented to the player as a particular reel spin outcome of reels 350, 352 and 354.

Figure 4:
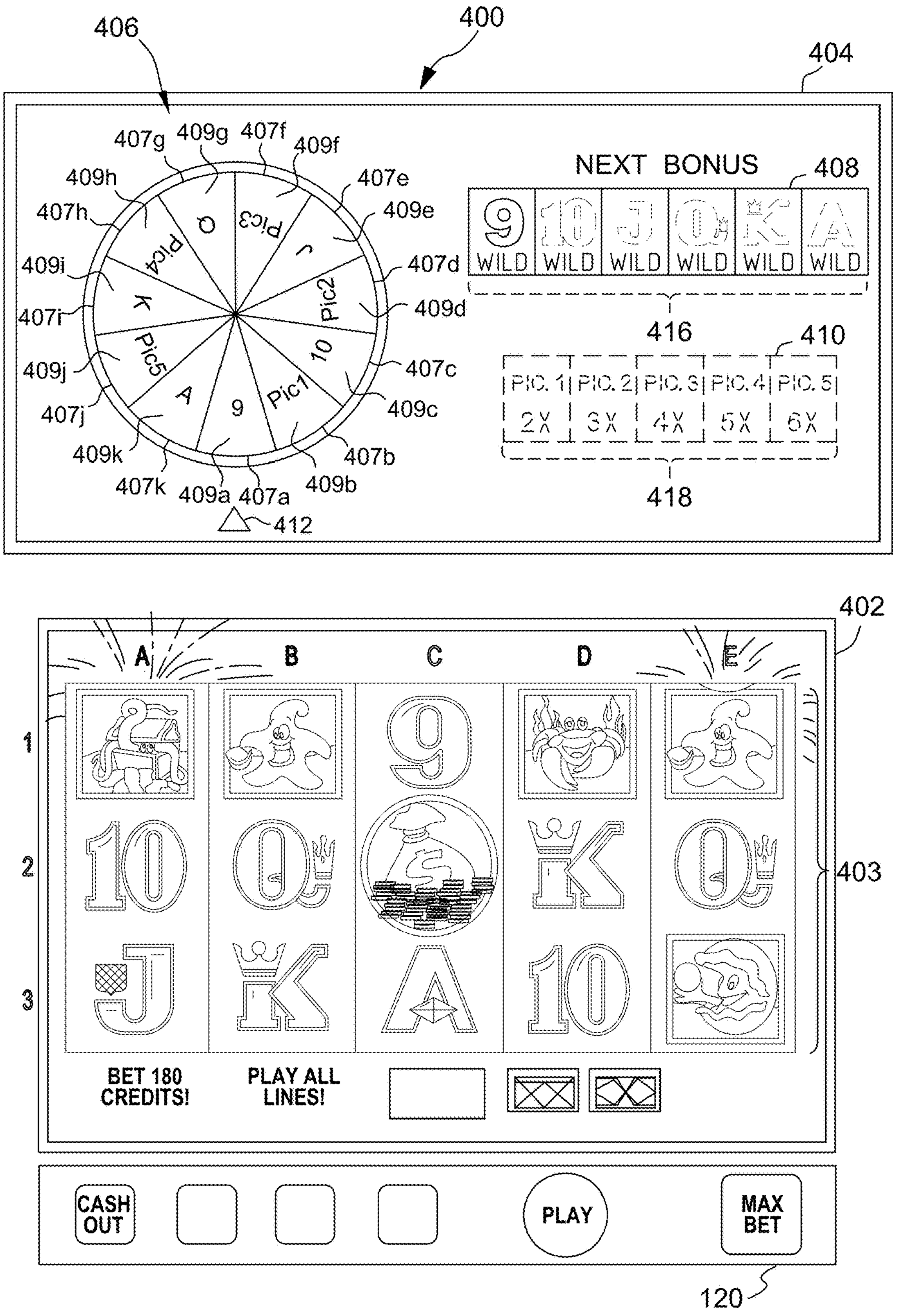
FIG. 4 illustrates an example game play user interface of a base game, which may be played on the EGM shown with reference to FIGS. 1-3B, and during which one or more game play enhancers may be collected and/or aggregated for use during a bonus game.

FIG. 4 illustrates an example game play UI 404 of a base game 400. As described herein, base game 400 may be initiated, in at least some embodiments, in response to a credit input by a player, such as via button deck 120. In other embodiments, base game 400 may be initiated in response to one or more other events, such as for example, in response to the conclusion of a feature game 500, which is described in additional detail below.

In the example embodiment, game play UI 304 includes a primary play area 402 and/or a secondary play area 404. In at least some embodiments, primary play area 402 may be included in primary game display 240, and secondary play area 404 may be included in secondary game display 242. In other embodiments, primary play area 402 and secondary play area 404 may be displayed on a single display device. Button deck 120 is also shown.

In addition, as shown, in the example embodiment, primary play area 402 may be configured to display a plurality of reels 403, which may include any suitable variety of symbols. More particularly, as described herein, in response to a UI outcome being generated, game processing backend system 314 may provide the UI outcome to UI system 302. In response, UI system 302 may update one or more game play UI elements 306A-306N to display the UI outcome in the form of a plurality of symbols on each of reels 403. In addition, reels 403 may be animated by UI system 302 to simulate spinning and stopping in various stop positions, where as a result, the plurality of symbols selected and/or updated by UI system 302 may be displayed on reels 403.

Secondary play area 404 may be configured to display a game play enhancer wheel 406 and/or one or more collected game play enhancers, such as for example, in a first collection area 408 and/or a second collection area 410. In at least some embodiments, game play enhancer wheel 406 may be divided into a plurality of segments or sectors 407*a-k*, and each sector 407*a-k* may display a distinct game play enhancer 409*a-k*. As described herein, game play enhancer wheel 406 may spin and stop in relation to a pointer 412 to identify a selected game play enhancer 409*a-k*, such as game play enhancer 409*a*, included in one of the plurality of sectors 407*a-k*. More specifically, each of the segments 407*a-k* may be associated with a weighted table indicating the probabilities that any one of the segments 407*a-k* will be selected during a spin of the wheel 406. In one embodiment, the probabilities in the weighted table are equal for each segment 407*a-k* (i.e., 1/11 in the embodiment of FIG. 4).

In other embodiments, the probabilities of the weighted table may be different for different segments 407*a-k*, such that some of the segments 407*a-k* are more likely than others to be selected during a spin of the wheel 406. In further embodiments, after one of the segments 407*a-k* has been selected from a spin of the wheel 406, the option for the same segment 407*a-k* to be drawn again may be removed until at least a bonus game has been played or a game play enhancer 409*a-k* associated with the segment has been used in the bonus game 500. For example, in some embodiments, after the segment 407*a* is selected, the display of the segment is changed (e.g., colored grey) and subsequent spins of the wheel 406 that select the segment 407*a* will not affect a return to the player in the bonus game. In other embodiments, the segment 407*a* may be removed from the wheel on the display 404 after the segment 407*a* is selected and the weighted table may adjusted to distribute the probability of the segment 407*a* being selected among the other segments 407*b*-407*k*. For example, in such embodiments, prior to the segment 407*a* being selected, each segment 407*a*-407*k* may have a probability of 1 in 11 of being selected and after the segment 407*a* is selected, each remaining segment 407*b*-407*k* may have a probability of 1 in 10 of being selected.

Furthermore, in at least some embodiments, game play enhancers 409*a-k* displayed by game play enhancer wheel 406 may correspond to and/or include any of the plurality of symbols that are capable of being displayed by reels 403, such as during base game 400 and/or during feature game 500. In addition, each game play enhancer 409*a-k* may be associated with a specific award or game enhancement during the bonus game 500, such as for example, that all 9s are WILD during bonus game 500 and/or that all "PIC1" symbols displayed during bonus game 500 will result in a multiplication factor being applied to any bonus game award. As a result, more generally, each game play enhancer 409*a-k* may include a symbol and a corresponding enhancement. As described herein, in some embodiments, the enhancement associated with each game play enhancer 409*a-k* may be displayed on wheel 406 with the associated game play enhancer 409*a-k*. Likewise, in some embodiments, enhancements may be displayed with each game play enhancer 409*a-k* in a corresponding collection area 408 and/or 410.

In the illustrated example, game play enhancers 409*a-k* include as follows: 9s, 10s, Js, Qs, Ks, and As are WILD (also referred to herein as a "symbol wild") during bonus game 500 (e.g., if collected from wheel 406). Symbols bearing pictures of symbols "PIC1," "PIC2," "PIC3," "PIC4," "PIC5," are associated with different multiplication factors. "PIC1"-"PIC5" are shorthand terms for different picture symbols, such as the MONEY BAG, STARFISH, CRAB, CLAM, and TREASURE CHEST symbols shown in first play area 402, etc., which can be displayed on reels 403. For example, the "PIC 1" is associated with a "2×" multiplier and the "PIC 2" enhancer is associated with a "3×" multiplier. In other embodiments, each of the picture symbol game play enhancers may be associated with the same multiplication factor. In further embodiments, the multiplication factor of the picture symbol enhancer may compound each time the picture symbol is selected during a spin of the wheel 406. For example, in some such embodiments, when initially selected by the wheel 406 in a first spin, the "PIC 1" enhancer is associated with a "2×" multiplier. If, during a second spin of the wheel 406, the "PIC 1" enhancer is again selected, the multiplication factor associated with the "PIC 1" enhancer is then increased, either incrementally or by a multiplier for example.

In the example embodiment, each of the game play enhancers for the picture symbols 409*b*, 409*d*, 409*f*, 409*h*, 409*j* are associated with a different multiplier. Moreover, although WILD symbols and multiplication factors are described herein, it will be appreciated that any of a variety of award enhancements (e.g., persistent or "sticky" WILDS, etc.) may be provided in association with various game play enhancers 409*a-k*. For example, in embodiments where the game play enhancers include sticky wilds, during a bonus game involving multiple spins, the sticky wild symbols that are stopped during each spin of the bonus game may stay in the stopped position on the reels 403 during subsequent spins, thereby increasing the potential award to the player during the subsequent spins.

In other embodiments, the award enhancement may modify the game play area of the reels 403. For example, in some embodiments, one of the award enhancements may change one or more of the symbol positions on the reels 403, one of the reels 403, and/or one of the rows, to WILD symbols. In other embodiments, an award enhancement is provided that adds an additional reel 403 (e.g., a sixth reel in the embodiment of FIG. 5) and/or adds an additional row (e.g., a fourth row in the embodiment FIG. 5). In still further embodiments, the award enhancement may modify a payout of a row of the reel 403 during the bonus game. For example, some such embodiments may include a row multiplier that multiplies any award based on a pay line 502 extending through a row associated with the award enhancement. Accordingly, numerous award enhancements may be provided.

As described above, in some embodiments, the award enhancement associated with each game play enhancer 409*a-k* (e.g., that a symbol is WILD or that a symbol is associated with a multiplier) may be displayed on wheel 406 in the corresponding sector 407*a-k*. Additionally or alternatively, in at least some embodiments, the award enhancement may be displayed in a corresponding collection area 408 and/or 410. In addition, in some embodiments, the award enhancement associated with each game play enhancer 409*a-k* may be increased each time a game play enhancer 409*a-k* is selected from wheel 406. For example, the first-time game play enhancer 409*b* (PIC1) is selected from wheel 406, game play enhancer 409*b* may be associated with multiplication factor of "2×." The second time game play enhancer 409*b* is selected from wheel 406, game play enhancer 409*b* may be associated with a larger multiplication factor, such as "3×." In some embodiments, game play enhancers 409*a-b* may also be associated with static enhancements, such as the same multiplication factor each time a game play enhancer 409*a-b* is selected.

In at least some embodiments, game play enhancer wheel 406 may be randomly spun, such as based upon a UI outcome, as described herein. Additionally or alternatively, in some embodiments, game play enhancer wheel 406 may be spun and stopped in response to the occurrence of one or more trigger conditions, such as, for example, in response to the occurrence of a pattern of symbols displayed by reels 403. For example, in one such embodiment, reels 403 include a wheel spin symbol (not shown) that triggers a spinning of the wheel 406 when it is shown as one of the stopped symbols after a spin of the reels 403.

In the example embodiment, when a game play enhancer, such as game play enhancer 409*a*, is randomly selected from game play enhancer wheel 406, the game play enhancer 409*a* may be added to and/or indicated in a collection area 408 and/or 410. For example, in some embodiments, first collection area 408 may display a first subset 416 of game play enhancers 409*a-k*, and second collection area 410 may display a second subset 418 of game play enhancers 409*a-k*, where second subset 418 may be different from first subset 416. For instance, first collection area 408 may display game play enhancers "9-A," as described above, while second collection area 410 may display game play enhancers "PIC1"-"PIC5." Accordingly, when a game play enhancer 409*a-k* is selected from game play enhancer wheel 406, one or more collections 408 and/or 410 may be modified in different ways to indicated selection of the game play enhancer 409*a-k*. Further, although game play enhancers "9-A' and "PIC1"-"PIC5" are described herein, many other game play enhancers are contemplated by and within the scope of the present disclosure.

More particularly, in at least some embodiments, each game play enhancer 409*a-k* of first subset 416 and each game play enhancer 409*a-k* of second subset 418 may be capable of being displayed in a first state, such as a dashed, non-bold, opaque, and/or grayed out state. The first state may indicate that the game play enhancer 409*a-k* has not been selected from game play enhancer wheel 406. Likewise, each game play enhancer 409*a-k* of first subset 416 and each game play enhancer 409*a-k* of second subset 418 may be capable of being displayed in a second state, such as a bolded, non-gray, non-opaque, highlighted, and/or illuminated state, and/or in any other condition or state to indicate that the game play enhancer 409*a-k* has been selected from game play enhancer wheel 406. Although a variety of states are described for displaying game play enhancers 409*a-k*, it will be appreciated many suitable changes to color, font, style, and the like may be implemented to build anticipation as well as to establish a visual sense of accomplishment or achievement, such as when there are many game play enhancers 409*a-k* displayed in the second state.

In some embodiments, different weighted tables are used for selecting one of the segments 407*a-k* based on game play enhancers that have already been selected. The different weighted tables may be used to decrease the probability that a player will collect multiple high value game play enhancers. For example, where a player collects the most valuable multiplier enhancer (e.g., "PIC. 5, 6× multiplier"), on a subsequent spin of the wheel, a different weighted table may be used that decreases the probability that a player will land on a second most valuable game play enhancer or the second most valuable enhancer may be removed from the weighted table and/or the wheel 406. Additionally, in some embodiments, one of the enhancers may be removed from the weighted table and/or wheel 406 after it has been selected a predetermined number of times and/or after it has achieved a maximum enhancing effect to prevent subsequent selections on the wheel 406 that do not add an enhancer during bonus gameplay. For example, in some embodiments, after the PIC. 5, 6× multiplier has been selected, it may be subsequently be removed from the weighted table and/or the wheel 406. Alternatively, the selected enhancers may remain in the weighted table and/or wheel 406 and subsequent selections of the previously selected enhancers may not add an additional enhancement during bonus game play. Different weighted tables may be stored and utilized for each possible collection of the available game play enhancers 409*a-k* and/or the weighted table may be continuously updated in response to selection of segments 407*a-k*. Moreover, in some embodiments, display 404 may be changed to correspond with the change in the weighted table, such as by showing a different wheel 406 having pie slices that are sized in correspondence with the associated probability of their being selected during a spin of the wheel 406.

In the illustrated example, game play enhancer 409*a* has been selected from game play enhancer wheel 406 and is displayed in first collection area 408 in a solid state to indicate that it has been selected. The remaining game play enhancers 409*b-k* have not, as yet, been selected, but may be selected and their appearance changed in their corresponding collection area 408 and/or 410 in response thereto.

In at least some embodiments, when a game play enhancer 409*a-k* is selected from wheel 406 and populated in a respective collection area 408 and/or 410, the game play enhancer may be stored in a memory device, such as a fast memory device (e.g., nonvolatile memory), for subsequent retrieval and/or use, as described herein, during a feature or bonus game. Accordingly, at least one technical improvement embodied by the present disclosure is that game play enhancers 409*a-k* may be stored in a memory device for rapid retrieval during a bonus game. Likewise, as described in additional detail herein, another technical improvement embodied by the present disclosure is that selected game play enhancers 409*a-k* are graphically displayed and accumulated in a collection area 408 and/or 410 for easy visual inspection by a player during play of the base game.

In some embodiments, collection areas 408 and 410 may be empty or blank at the beginning of base game 400 and filled with collected game play enhancers 409*a-k* as game play enhancers 409*a-k* are awarded or selected by wheel 406. Accordingly, in various embodiments, collection areas may be populated by selected game play enhancers 409*a-k* in response to spins of game play enhancer wheel 406. Additionally or alternatively, in at least some embodiments, collection areas 408 and 410 may be initially populated with game play enhancers 409*a-k* in a first state, and the state of each game play enhancer 409*a-k* displayed in a collection area 408 and/or 410 may be changed to a second state to indicate selection. It can therefore be seen that display of selected game play enhancers 409*a-k* in collection areas 408 and 410 may be accomplished in a variety of ways and using different graphics or indicia as well as using different collection or aggregation mechanisms.

Accordingly, during play of base game 400, game play enhancers 409*a-k* may be collected from wheel 406 and shown in collection areas 408 and/or 410 to provide a visual indication to the player which game play enhancers 409*a-k* have been collected. In the example embodiment, and as described in greater detail below, the collected game play enhancers 409*a-k* may be applied or used during bonus game 500 to enhance bonus game play and/or bonus game awards. As a result, the phrase "NEXT BONUS," "NEXT FEATURE EVENT," and/or a similar phrase may be displayed above and/or near collection areas 408 and/or 410 to indicate that the game play enhancers 409*a-k* displayed or identified in a second state (as described above) will be made available during the next bonus game 500 initiated from base game 400. In some embodiments, game play enhancers 409*a-k* that have been collected may also be applied to other events, such as instant single re-spin events within the base game, and the like.

In some embodiments, game play enhancers 409*a-k* collected from wheel 406 may be persistently stored or shown in collection areas 408 and/or 410 (and/or stored in the fast memory device) for use during multiple bonus rounds. As a result, in at least some embodiments, each time bonus game 500 is initiated from base game 400, the player may have access to a greater number of game play enhancers 409*a-k*. Subsequent or successive bonus games 500 may, in this manner, be made to offer successively greater award opportunities, as greater numbers of game play enhancers 409*a-k* may be successively collected and applied to series of bonus games 500.

Similarly, in some embodiments, collected game play enhancers 409*a-k* may be persistently stored and/or shown in a respective collection area 408 and/or 410 over the course of several bonus games 500 until they are used during a given bonus game, as described in additional detail below, whereupon, after being used, they may be removed or cleared from a given collection area 408 and/or 410 and may become available for re-collection during one or more subsequent or additional base games 400.

In the illustrated embodiment, the persistent storing of the game play enhancers 409*a-k* is provided by generating a reconfiguration data file based on the selected game play enhancer that includes executable instructions which cause game play of the bonus game 500 to be modified. For example, the standard bonus game (i.e., the bonus game 500 without any game play enhancer modifications) is stored on the memory 208 of the gaming device 200. In response to a game play enhancer 409*a-k* being selected during game play of the base game 400, a reconfiguration data file is generated by the processor 204 which includes the selected game play enhancer. The reconfiguration data file may be stored in the memory 208 and continuously updated based on other selected game play enhancers 409*a-k*. When the bonus game 500 is triggered, the bonus game 500 is then initiated based on the reconfiguration data file, to include the collected game play enhancers 409*a-k*. As a result, the parameters of the bonus game 500 may be established during play of the base game 400, thereby reducing data processing and time required to initiate the bonus game 500.

Figure 5:
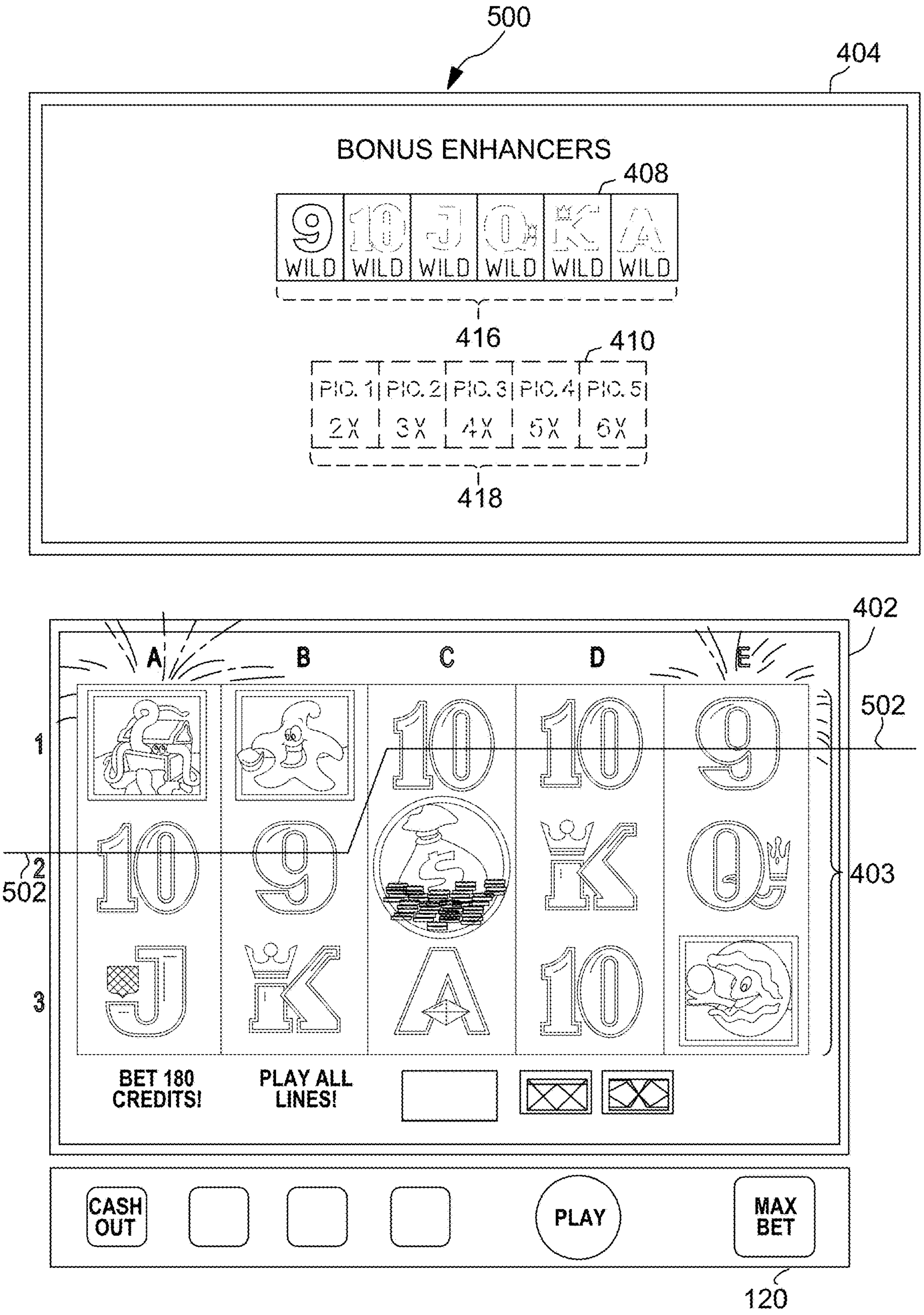
FIG. 5 illustrates an example bonus game play user interface of a bonus game, which may be triggered from the base game shown in FIG. 4, and which may be played on the EGM shown with reference to FIGS. 1-3B, and during which the game play enhancers collected during the base game may be used.

FIG. 5 illustrates an example bonus game play UI 308 of bonus game 500. As described herein, in at least some embodiments, bonus game 500 may be initiated from base game 400, such as in response to the occurrence of a trigger condition. For example, in some embodiments, bonus game 500 may be initiated when a predefined symbol combination is shown on reels 403 or after a predefined number of plays of the base game. Likewise, in at least some embodiments, bonus game 500 may be randomly initiated, such as based upon a random number generated by RNG 212.

In some embodiments, the likelihood that the bonus game will be triggered after a subsequent spin may be changed based on the number of collected game play enhancers 409*a-k*. For example, in some embodiments the probability is increased as additional game play enhancers 409*a-k* are collected. Likewise, the probability of earning additional game play enhancers 409*a-k* may be decreased as additional game play enhancers 409*a-k* are collected. As a result, an expected number of enhancers 409*a-k*, and/or changes in the expected RTP to the player in the bonus game 500, may be maintained at a target or within a target range.

In further embodiments, bonus game 500 may be triggered by a user selection during play of the base game (e.g., as shown in FIG. 4). In some such embodiments, during play of the base game, the player may be presented with an option to "Buy a Bonus," to trigger play of the bonus round, which may be selected by the player to enter the bonus game using the game play enhancers that have been earned during play of the base game. Moreover, in such embodiments, the price or amount of credits, required for the player to "Buy a Bonus," may be determined based on the collected game play enhancers to maintain a target RTP of the bonus game. For example, in some embodiments, the amount of credits required for a player to "Buy a Bonus," increases with the number of game play enhancers that have been collected during play of the base game 400.

In the example embodiment, bonus game play UI 308 includes primary play area 402 and/or secondary play area 404. As described herein in at least some embodiments, primary play area 402 may be included in primary game display 240, and secondary play area 404 may be included in secondary game display 242. In other embodiments, primary play area 402 and secondary play area 404 may be displayed on a single display device. Button deck 120 is also shown.

Unlike base game 400, in at least some embodiments, bonus game play UI 308 (e.g., secondary play area 404) may not include game play enhancer wheel 406. Rather, in the example embodiment, secondary play area 404 may display collection areas 408 and/or 410 to show game play enhancers 409*a-k* collected by the player during base game 400. The phrase "BONUS ENHANCERS" and/or another suitable phrase may be provided near collection areas 408 and 410 to provide a visual indication to the player of the game play enhancers 409*a-k* that were collected during base game 400 and which will be available during play of bonus game 500 for the purpose of enhancing play of bonus game 500, as described herein. Further, although secondary play area 404 excludes wheel 406 in the illustrated example, in at least some embodiments, wheel 406 may be present during bonus game 500 (e.g., to permit collection of game play enhancers 409*a-k* during bonus game 500).

As shown, during bonus game 500, primary game play area 402 may be configured to display reels 403, which may include any suitable variety of symbols. More particularly, as described herein, in response to a UI outcome being generated for bonus game 500, game processing backend system 314 may provide the UI outcome to UI system 302. In response, UI system 302 may update one or more bonus game play UI elements 310A-310N to display the UI outcome in the form of a plurality of symbols on each of reels 403. In addition, reels 403 may be animated by UI system 302 to simulate spinning and stopping in various stop positions, where as a result, the plurality of symbols selected and/or updated by UI system 302 may be displayed on reels 403.

In at least some embodiments, the symbols provided on reels 403 during bonus game 500 may differ from the symbols provided on reels 403 during base game 400. For example, in various embodiments, a greater number of game play enhancers 409*a-k* may be provided on reels 403 (e.g., in comparison to base game 400). However, in other embodiments, the symbols provided on reels 403 during bonus game 500, although they may include game play enhancers 409*a-k*, may be the same as the symbols provided on reels 403 during base game 400. These features may be included, it will be appreciated, in association with any of a wide variety of games, such as, but not limited to, any of a variety of Class III games.

In some embodiments, the systems and methods described herein may also be provided in association with a variety of Class II games, such as for example, bingo games as described above with respect to FIG. 3B. Although these details are not central to an understanding of the present disclosure, in at least one embodiment, reels 403 may be spun and stopped to display base game outcomes and bonus game outcomes based upon one or more bingo game outcomes. It will thus be appreciated that bingo game outcomes may be mapped, in a Class II setting, to a variety of reel outcomes to provide the functionality described herein.

Further, in at least some embodiments, and in the case of Class II gaming, during bonus game 500, one or more different paytables (as opposed to and/or including different sets of reels or reels having greater numbers of game play enhancers 409*a-k*) may be provided during bonus game 500. For example, paytables designating game play enhancers 409*a-k* as being WILD and/or associating game play enhancers 409*a-k* with one or more multiplication factors, may be provided during a Class II version of bonus game 500. Likewise, paytables designating a greater number of winning patterns may be provided in a Class II setting. In addition, in at least some embodiments, enhanced bonus states may be mapped to Class II paytables of equivalent return to player (RTP).

Moreover, in at least some embodiments, the number of collectable game play enhancers 409*a-k* may be limited in the Class II game to limit a number of corresponding potential reel facades necessary for play of the bonus game 500. For example, in some embodiments, the bonus game 500 is automatically triggered when a predefined number of game play enhancers 409*a-k* have been collected by the user. As a result, the number of facades necessary to display during the bonus game 500 may be limited, thereby saving memory storage and processing power during play of the bonus game 500.

Accordingly, during play of bonus game 500, reels 403 may be simulated to spin and stop to display a plurality of symbols, at least some of which may include game play enhancers 409*a-k*. In the illustrated example, two 9s (which are associated with a WILD symbol enhancement, as described above) are displayed on reels 403 after they have been spun and stopped. As a result, in this example, a win line 502 is formed, from left to right, using the WILD 9s, which the player collected from wheel 406 during play of base game 400.

Although in this example, win line 502 is formed using WILD 9s, it can be seen that any of a variety of enhancements to bonus game 500 are possible using the game play enhancers 409*a-k* collected by the player during base game 400. Further, as described above, these enhancements may be further boosted or improved by swapping a greater number of game play enhancers 409*a-k* into reels 403 during bonus game 500, where as a result, the chances that game play enhancers 409*a-k* collected by the player will appear are also increased.

Figure 6:
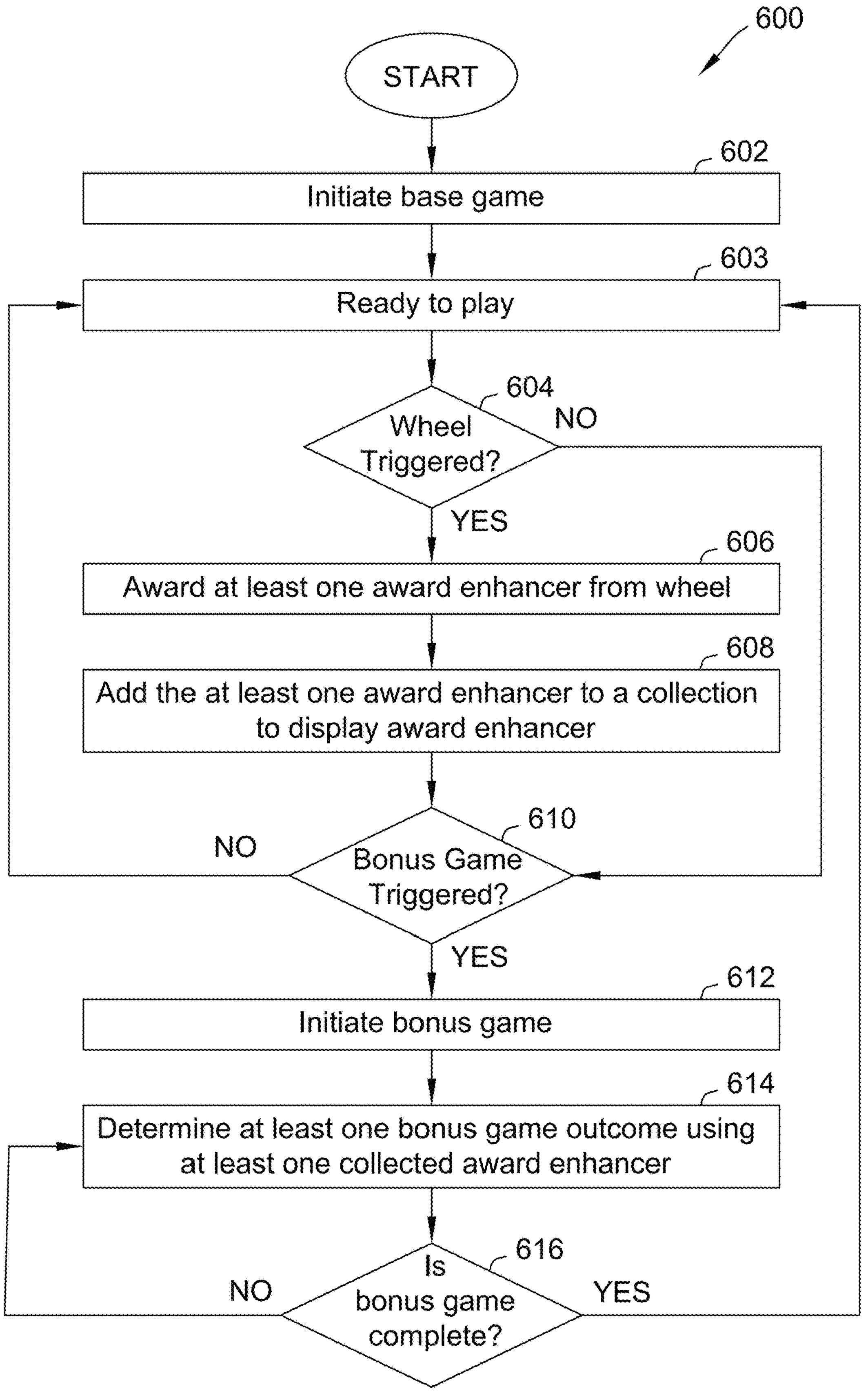
FIG. 6 is a flowchart illustrating an example process for providing a base game and a bonus game, during which one or more game play enhancers may be collected and used to enhance the bonus game.

FIG. 6 is a flowchart illustrating a process 600 for collecting game play enhancers 409*a-k* during base game 400 and applying the collected game play enhancers 409*a-k* during bonus game 500, as described in additional detail above. Accordingly, in the example embodiment, base game 400 may be initiated, such as in response to a credit input and/or wager placed by the player (step 602). As a result, base game 400 may enter a "READY TO PLAY" state, in which a player places one or more wagers to cause reels 403 to spin and stop (step 603).

As described herein, during base game 400, a UI outcome may be generated and provided to UI system 302. In response to receiving the UI outcome, UI system 302 may update one or more game play UI elements 306A-306N to display the UI outcome in the form of a plurality of symbols on each of reels 403. In addition, reels 403 may be animated by UI system 302 to simulate spinning and stopping in various stop positions, where as a result, the plurality of symbols selected and/or updated by UI system 302 may be displayed on reels 403.

Further, during play of base game 400, UI system 302 may determine whether game play enhancer wheel 406 is triggered (step 604). For example, if a predefined combination of symbols is displayed on reels 403, UI system 302 may cause wheel 406 to spin and stop, such as in relation to a pointer 412, to identify a selected game play enhancer 409*a-k*. In the example shown at FIG. 4, game play enhancer 409*a* is selected and awarded to the player (step 606). In the example embodiment, the selected game play enhancer 409*a* is also added to a collection 408 and/or 410 (or identified, such as by changing the visual appearance, in a corresponding collection 408 and/or 410) (step 608). In some embodiments, wheel 406 may be spun once in response to the trigger event. In other embodiments, wheel 406 may be spun two or more times in response to any single trigger event. As a result, in some cases, multiple game play enhancers 409*a-k* may be selected and awarded in response to trigger events. Additionally, after at least one game play enhancer 409*a-k* is awarded, a reconfiguration data file is generated based on the awarded game play enhancer 409*a-k* that includes executable instructions which cause game play of the bonus game 500 to be modified (e.g., based which game play enhancer 409*a-k* is awarded).

Following selection and awarding of at least one game play enhancer 409*a-k* (e.g., addition to a collection 408 and/or 410), base game 400 may continue, such as by continuing to spin reels 403 in response to subsequent wagers. During base game 400, wheel 406 may be triggered any number of times, and each time wheel 406 is triggered, one or more game play enhancers 409*a-k* may, if they have not already been added to a collection 408 and/or 410, be awarded to the player and added to a corresponding collection 408 and/or 410 (step 603).

As base game 400 continues, a bonus game trigger, such as a different predefined symbol combination on reels 403, may occur (step 610). In response to the occurrence of a bonus game trigger, bonus game 500 (or another in-game feature) may be initiated (step 612) based on the reconfiguration data file, whereupon bonus game 500 may be displayed, and during which the game play enhancers 409*a-k* earned or collected by the player during base game 400 may be used to determine and enhance one or more game outcomes of bonus game 500 (step 614).

For example, as described above and as shown with reference to FIGS. 4 and 5, if game play enhancer 409*a* (WILD 9s) has been collected, when game play enhancer appears on reels 403 during bonus game 500, the enhancement associated with game play enhancer 409*a* may be applied to the game outcome provided on reels 403. In the illustrated example, win line 502 is formed using several game play enhancers 409*a* that appear on reels 403 after being spun and stopped during bonus game 500. Win line 502 may, in addition, be associated with a prize or game award (e.g., a number of credits), which may be added to the player's credit balance.

In various embodiments, bonus game 500 may include a single spin of reels 403 and/or a plurality of spins of reels 403, such as for example, a plurality of free spins, a number of which may be provided in proportion to a wager amount, randomly, and/or based on any other suitable criterion.

UI system 302 may also, as shown, determine whether the bonus game or bonus feature is complete, and if so, game play may return to the "READY TO PLAY" state (steps 616 and 603). If, on the other hand, the bonus or feature game is not complete, one or more additional bonus game outcomes may be determined, as described herein (step 614).

In addition, in some embodiments, collections 408 and/or 410 may be cleared following completion of bonus game 500. In other embodiments, game play enhancers 409*a-k* already collected may persist following completion of bonus game 500. In one example, game play enhancers 409*a-k* that the player has collected but which were not applied or used during the bonus game 500 may not be cleared but may persist for use during one or more subsequent bonus games 500. As an example, referring to FIG. 5, in such embodiments if the "9's wild" collected enhancer was not used during the bonus game 500, the "9's wild" enhancer would persist or remain in the collection 408 upon returning to the base game.

In some embodiments, if the collections 408 and/or 410 are cleared following completion of bonus game 500, a new game play enhancer 409*a-k* is randomly selected prior to resuming the base game, such that at least one game play enhancer 409*a-k* is always collected during play of the base game. Keeping at least one game play enhancer 409*a-k* in the collections 408 and/or 410 may provide added incentive for players to keep playing the base game after the previous collections have been used. For example, in one embodiment, after completing a bonus game in which all collected game play enhancers 409*a-k* were used, a new game play enhancer 409*a-k* may be randomly selected and added to collections 408 and/or 410. In other embodiments, the wheel 406 is spun to determine a new game play enhancer 409*a-k* to add to the collections 408 and/or 410.

Systems and methods for providing and collecting one or more game play enhancers during a base game, and for use during a bonus game, are thus described. In at least some embodiments, one or more collection areas may be displayed, such as in association with a wheel that displays a plurality of game play enhancers capable of selection and aggregation to one or more of the collection areas. During game play, a base game may be initially provided, and in some cases, the wheel may be triggered during the base game. When the wheel spins, one or more game play enhancers may be selected from the wheel and aggregated in a given collection area. A player of the base game may thus refer to the collection during play of the base game to keep track of the award enhancements that have been collected.

In addition, a bonus or feature game may be triggered in response to one or more trigger conditions occurring during the base game. When the bonus game is triggered, the game play enhancers that have been collected by the player may be made available, such as for example, to enhance the chances of winning during play of the bonus game and/or to enhance awards provided during the bonus game. In one example, a game play enhancer may specify that a given symbol displayed during the bonus game is a WILD symbol, thereby increasing the chances that the player will form winning symbol combinations during the bonus game. In another example, a game play enhancer may specify that a given symbol displayed during the bonus game is associated with a multiplication factor, thereby enhancing an award provided during the bonus game.

As a result, technical improvements and technical effects of the systems and methods described herein include, but are not limited to: (i) providing a base game during which a player may aggregate or collect one or more game play enhancers to be used during a bonus game, (ii) prolonged and persistent aggregation or collection of various game play enhancers, such as over the course of multiple base games and/or multiple bonus games, (iii) enhancement of the overall chances of winning during a bonus game (e.g., by making certain symbols WILD), (iv) enhancement of an award provided during a bonus game (e.g., by multiplying the bonus game award), (v) further enhancement of the chances of winning during play of a bonus game by adding one or more game play enhancers to the reels used during the bonus game (e.g., reel replacement or symbol replacement to include greater numbers of game play enhancers), (vi) during a Class II game, in addition to the features described above, adding paytables or swapping base game paytables for bonus game paytables to provide greater numbers of winning patterns, and/or adding paytables designating game play enhancers as being WILD, and/or associating game play enhancers with one or more multiplication factors, (vii) storage of game play enhancers in a memory device, such as nonvolatile memory for rapid retrieve and/or use during the bonus game, (viii) display of accumulated game play enhancers for "at a glance" visual inspection by a player during play of a base game, (ix) creation of a sense of player equity or investment in play of the base and bonus game, as game play enhancers are accumulated, used, and in some cases, recycled back into the base game (e.g., where they are unused during a round of bonus game play), (x) reduced processing power and time to initiate a bonus game by configuring the parameters (e.g., game play enhancements) during play of a base game.

While the disclosure has been described with respect to the figures, it will be appreciated that many modifications and changes may be made by those skilled in the art without departing from the spirit of the disclosure. Any variation and derivation from the above description and figures are included in the scope of the present disclosure as defined by the claims.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. An electronic gaming machine comprising:

a memory device; and a processor configured to execute instructions stored on the memory device, which when executed, cause the processor to:

initiate a base game;

store a game play enhancer for a first symbol for use during a bonus game, the game play enhancer being stored in response to the first symbol occurring in an outcome during play of the base game;

generate, prior to a trigger condition for the bonus game being satisfied, a reconfiguration data file based on the stored game play enhancer, the reconfiguration data file including executable instructions causing game play of the bonus game to be modified by changing an evaluation of the first symbol during the bonus game;

initiate, in response to a trigger condition being satisfied, the bonus game based on the reconfiguration data file; and determine a game outcome of the bonus game based on the reconfiguration data file by evaluating independent occurrences of the first symbol in the game outcome of the bonus game according to the stored game play enhancer.

2. The electronic gaming machine of claim 1, wherein the bonus game is a slot game comprising a plurality of reels and a plurality of symbols provided on the reels in a plurality of rows, and wherein the game play enhancer changes the evaluation of the first symbol during the bonus game to include at least one of a symbol WILD and a symbol multiplier.

3. The electronic gaming machine of claim 1, wherein the stored game play enhancer comprises a first game play enhancer stored during a first round of the base game and a second game play enhancer stored during a second round of the base game.

4. The electronic gaming machine of claim 3, wherein the reconfiguration data file is generated based on the first game play enhancer and is modified based on the second game play enhancer.

5. The electronic gaming machine of claim 3, wherein the instructions, when executed, further cause the processor to:

revert gameplay to the base game after completing a first plurality of game play rounds of the bonus game;

remove the first game play enhancer from the reconfiguration data file in response to the first game play enhancer being used during the first plurality of game play rounds of the bonus game; and keep the second game play enhancer in the reconfiguration data file in response to the second game play enhancer not being used during the first plurality of game play rounds of the bonus game.

6. The electronic gaming machine of claim 3, wherein the first game play enhancer modifies an award of the bonus game and the second game play enhancer modifies a game play area of the bonus game.

7. The electronic gaming machine of claim 1, wherein the game play enhancer is a first game play enhancer and is randomly selected from a plurality of game play enhancers based on a weighted table.

8. The electronic gaming machine of claim 7, wherein the weighted table is a first weighted table, and wherein the instructions, when executed, further cause to the processor to:

determine a second weighted table based on the stored first game play enhancer; and select a second game play enhancer for use during the bonus game based on the second weighted table.

9. The electronic gaming machine of claim 1, wherein the bonus game is initiated based on a number of game play enhancers that are selected during play of the base game.

10. The electronic gaming machine of claim 1, wherein the base game is a slot game comprising a plurality of reels and a plurality of symbols provided on the reels in a plurality of rows, wherein the instructions, when executed, further cause to the processor to initiate a randomized selection of the game play enhancer based on a game outcome of the base game including at least one trigger symbol.

11. A method comprising:

initiating, by a processor, a base game;

storing, by the processor, a game play enhancer for a first symbol for use during a bonus game, the game play enhancer being stored in response to the first symbol occurring in an outcome during play of the base game;

generating, by the processor, prior to a trigger condition for the bonus game being satisfied, a reconfiguration data file based on the stored game play enhancer, the reconfiguration data file including executable instructions causing game play of the bonus game to be modified by changing an evaluation of the first symbol during the bonus game;

initiating, by the processor and in response to a trigger condition being satisfied, the bonus game based on the reconfiguration data file; and determining, by the processor, a game outcome of the bonus game based on the reconfiguration data file by evaluating independent occurrences of the first symbol in the game outcome of the bonus game according to the stored game play enhancer.

12. The method of claim 11 further comprising displaying, by the processor, the stored game play enhancer in a collection area during play of the base game.

13. The method of claim 11, wherein the bonus game is a slot game comprising a plurality of reels and a plurality of symbols provided on the reels in a plurality of rows, and wherein the game play enhancer changes the evaluation of the first symbol during the bonus game to include at least one of a symbol WILD and a symbol multiplier.

14. The method of claim 11, wherein the stored game play enhancer includes a first game play enhancer stored during a first round of the base game and a second game play enhancer stored during a second round of the base game.

15. The method of claim 14, wherein the reconfiguration data file is generated based on the first game play enhancer and is modified based on the second game play enhancer.

16. The method of claim 14 further comprising:

reverting gameplay to the base game after completing a first plurality of game play rounds of the bonus game;

removing, by the processor, the first game play enhancer from the reconfiguration data file in response to the first game play enhancer being used during the first plurality of game play rounds of the bonus game; and keeping, by the processor, the second game play enhancer in the reconfiguration data file in response to the second game play enhancer not being used during the first plurality of game play rounds of the bonus game.

17. The method of claim 14, wherein the first game play enhancer modifies an award of the bonus game and the second game play enhancer modifies a game play area of the bonus game.

18. The method of claim 11, wherein the game play enhancer is a first game play enhancer and is randomly selected from a plurality of game play enhancers based on a weighted table.

19. The method of claim 18, wherein the weighted table is a first weighted table, and wherein the method further comprises:

determining, by the processor, a second weighted table based on the stored first game play enhancer; and selecting, by the processor, a second game play enhancer for use during the bonus game based on the second weighted table.

20. An electronic gaming machine comprising:

a display;

a memory device; and a processor configured to execute instructions stored on the memory device, which when executed, cause the processor to:

initiate a base game;

store a game play enhancer for a first symbol for use during a bonus game, the game play enhancer being stored in response to the first symbol occurring in an outcome during play of the base game;

cause the game play enhancer to be shown on the display during play of the base game;

generate, prior to a trigger condition for the bonus game being satisfied, a reconfiguration data file based on the stored game play enhancer, the reconfiguration data file including executable instructions causing game play of the bonus game to be modified by changing an evaluation of the first symbol during the bonus game; and initiate, in response to a trigger condition being satisfied, the bonus game based on the reconfiguration data file, wherein a game outcome for the bonus game is determined by evaluating independent occurrences of the first symbol in the game outcome of the bonus game according to the stored game play enhancer.

* * * * *